(12) United States Patent
Fujita et al.

(10) Patent No.: US 9,022,481 B2
(45) Date of Patent: May 5, 2015

(54) CUSHION MEMBER AND SEAT STRUCTURE

(75) Inventors: Etsunori Fujita, Hiroshima (JP); Yumi Ogura, Hiroshima (JP); Seiji Kawasaki, Hiroshima (JP); Yuki Arita, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/005,276

(22) PCT Filed: Mar. 23, 2012

(86) PCT No.: PCT/JP2012/057634
§ 371 (c)(1),
(2), (4) Date: Sep. 16, 2013

(87) PCT Pub. No.: WO2012/128370
PCT Pub. Date: Sep. 27, 2012

(65) Prior Publication Data
US 2014/0001814 A1    Jan. 2, 2014

(30) Foreign Application Priority Data
Mar. 23, 2011    (JP) ................. 2011-065093

(51) Int. Cl.
*A47C 7/18*    (2006.01)
*A47C 7/20*    (2006.01)
(Continued)

(52) U.S. Cl.
CPC . *B60N 2/64* (2013.01); *A47C 27/22* (2013.01); *A47C 31/006* (2013.01); *A47C 7/18* (2013.01); *A47C 7/287* (2013.01)

(58) Field of Classification Search
USPC ........................................ 297/452.27, 452.48
See application file for complete search history.

(56) References Cited

U.S. PATENT DOCUMENTS 4,025,974 A    5/1977    Lea et al.
4,149,919 A    4/1979    Lea et al.
(Continued)

FOREIGN PATENT DOCUMENTS

JP    11 56522    3/1999
JP    11 216039    8/1999
(Continued)

OTHER PUBLICATIONS

International Search Report Issued May 22, 2012 in PCT/JP12/057634 Filed Mar. 23, 2012.
(Continued)

*Primary Examiner* — Rodney B White
(74) *Attorney, Agent, or Firm* — Oblon, McClelland, Maier & Neustadt, L.L.P.

(57) ABSTRACT

A cushion member includes an intermediate layer, and an upper layer and lower layer stacked and fixed thereto. The cushion member is fixed to a frame by bending an end part of the cushion member so that the upper layer comes to the front side and the lower layer comes to the back side. The intermediate layer is subjected to shear force and the upper layer and the lower layer are subjected to compressive and tensile stress. With the spring characteristic of the intermediate layer, residual stress of the tension and compression is applied to the upper and lower layers from the intermediate layer. Thus, the cushion member can have a restoring property, generation of creases during no load application can be reduced, permanent setting is made less likely, and a compression characteristic in the thickness direction is increased.

11 Claims, 27 Drawing Sheets

(51) Int. Cl.
*B60N 2/64* (2006.01)
*A47C 27/22* (2006.01)
*A47C 31/00* (2006.01)
*A47C 7/28* (2006.01)

(56) References Cited

U.S. PATENT DOCUMENTS

| | | | |
|---|---|---|---|
| 4,261,776 A | | 4/1981 | Lea et al. |
| 4,951,334 A | * | 8/1990 | Maier .................. 297/452.27 X |
| 5,085,487 A | * | 2/1992 | Weingartner et al. .... 297/452.27 |
| 5,283,918 A | * | 2/1994 | Weingartner et al. .... 297/452.27 X |
| 5,564,144 A | * | 10/1996 | Weingartner et al. .... 297/452.27 |
| 5,632,053 A | * | 5/1997 | Weingartner et al. .... 297/452.27 X |
| 6,817,674 B2 | * | 11/2004 | Fujita et al. .......... 297/452.27 X |

| | | |
|---|---|---|
| 2003/0116999 A1 | 6/2003 | Fujita et al. |
| 2004/0232743 A1 | 11/2004 | Fujita et al. |
| 2004/0262976 A1 | 12/2004 | Kawasaki |

FOREIGN PATENT DOCUMENTS

| | | |
|---|---|---|
| JP | 2003 182427 | 7/2003 |
| JP | 2004 329481 | 11/2004 |
| WO | 2004 014192 | 2/2004 |

OTHER PUBLICATIONS

European Communication pursuant to Rules 70(2) and 70a(2) EPC, issued Oct. 16, 2014, in Application No. / Patent No. 12761287.7-1653 / 2689691.

The Extended European Search Report issued Sep. 29, 2014, in Application No. / Patent No. 12761287.7-1653 / 2689691.

* cited by examiner

CUSHION MEMBER AND SEAT STRUCTURE

TECHNICAL FIELD

The present invention relates to a cushion member suitably used for a seat for a vehicle such as a car, an aircraft, or a train and applicable to furniture, an office chair or the like and to a seat structure using the cushion member.

BACKGROUND ART

The present applicant has suggested various seat structures for improving the vibration-absorbing characteristic, the shock-absorbing characteristic, and the like, in which a cushion member is elastically supported by a frame supported by a torsion bar disposed in the front or back of a seat cushion part, or a cushion member is elastically supported by stretching the cushion member between side frames or front and back frames and supporting a part of the cushion member with a coil spring, thereby having the cushion member disposed as a tensile structure (see, for example, Patent Documents 1 and 2).

REFERENCES

Patent Document

Patent Document 1: Japanese Unexamined Patent Application Publication No. 2003-182427
Patent Document 2: Japanese Unexamined Patent Application Publication No. 2004-329481

DISCLOSURE OF THE INVENTION

Problems to be Solved by the Invention

In Patent Documents 1 and 2, a three-dimensional knitted fabric, a thin urethane material laminated with a two-dimensional net material, or the like is used as the cushion member. However, for achieving a desired stroke when the pressure is applied in the thickness direction by adjusting the tension of the cushion member in a plane direction, the spring characteristic of the torsion bar or the coil spring is utilized mainly as above; in this case, the operation and the effect of improving the permanent setting characteristic, preventing the creases by applying tension to the surface layer, and further imparting the stroke sense by the cushion member itself are relatively small.

The present invention has been made in view of the above, and it is an object of the present invention to provide a cushion member which contributes to simplification of the structure of an entire seat structure and cost reduction by allowing an intermediate layer to apply a tension characteristic (residual stress) to upper and lower layers of a cushion member used as a tensile structure and reducing the number of spring members used, such as coil springs, and to provide a seat structure using the cushion member.

Solutions to the Problems

A cushion member according to the present invention for solving the above problem includes a multilayer structure including at least one intermediate layer and an upper layer and a lower layer stacked above and below the intermediate layer, wherein: the intermediate layer includes resin foam with predetermined thickness; the upper layer and the lower layer are fixed to a front surface side and a back surface side of the resin foam included in the intermediate layer, respectively; and the cushion member is provided as a tensile structure by being stretched between frames disposed apart from each other by a predetermined distance so that the upper layer on a front side has higher tension than the lower layer in a plane direction.

It is preferable that the cushion member is stretched between the frames by bending an end part so that the upper layer at the end part comes to the front side and the lower layer at the end part comes to a back side, and the upper layer has higher tension than the lower layer in the plane direction. In the cushion member, it is preferable that the resin foam and the upper layer, or the resin foam and the lower layer are fixed to each other in a manner that a part of the resin foam in a thickness direction intrudes into a gap between strands of cloth included in the upper layer or the lower layer. It is preferable that the cloth included in the upper layer or the lower layer is two-dimensional cloth or three-dimensional cloth. It is preferable that the cloth included in the upper layer or the lower layer is three-dimensional cloth, the three-dimensional cloth includes a pair of ground knits disposed apart from each other and a number of connecting strands for connecting the pair of ground knits by going back and forth between the pair of ground knits, and a part of the resin foam included in the intermediate layer in the thickness direction intrudes into a gap between the strands from one ground knit side of the three-dimensional cloth adjacent to the intermediate layer and the amount of intrusion is in the range of not having contact with at least a part of the other ground knit of the three-dimensional cloth. It is preferable that a knit texture of at least one ground knit of the three-dimensional cloth has a honeycomb shape. It is preferable that the amount of intrusion of a part of the resin foam included in the intermediate layer in the thickness direction from the one ground knit side of the three-dimensional cloth is in the range of ⅓ to ⅔ of the thickness of the three-dimensional cloth. It is preferable that the resin foam included in the intermediate layer is polyurethane foam.

It is preferable that the upper layer and the lower layer having the intermediate layer interposed therebetween are stacked so that a mutual positional relation based on a roll direction as a winding direction of a roll thereof is set to a predetermined positional relation, thereby setting a tension characteristic of the plane direction to a predetermined characteristic in the range of anisotropy to isotropy.

It is preferable that two or more of the intermediate layers are provided, and a layer interposed between the intermediate layers is a layer which serves as both a lower layer of an upper intermediate layer and an upper layer of a lower intermediate layer. It is preferable that the cushion member is stretched for each frame of a seat cushion part, a seat back part, a head rest part, an arm rest part, or an ottoman part with a seat structure.

A seat structure of the present invention has the cushion member stretched for each frame of a seat cushion part, a seat back part, a head rest part, an arm rest part, or an ottoman part, wherein the cushion member is provided as a tensile structure by being stretched between frames disposed separate from each other by a predetermined distance among the frames so that the upper layer on the front side has higher tension than the lower layer in the plane direction. The seat structure preferably has a configuration in which the cushion member is stretched between the frames by bending the end part of the cushion member so that the upper layer at the end part comes to the front side and the lower layer at the end part comes to the back side.

Effects of the Invention

In the cushion member of the present invention, the upper layer and the lower layer are fixed and stacked with resin foam interposed therebetween. By stretching the cushion member between frames which are separated from each other by a predetermined distance with the upper layer facing the front side, the cushion member can be provided so that the tension in the plane direction also operates upward and the upper layer along the plane direction has higher tension than the lower layer. Thus, due to the spring characteristic of the intermediate layer, the residual stress of tension/compression is applied from the intermediate layer, so that the upper layer is subjected to the tensile stress and the lower layer is subjected to the compressive stress. As a result, the force of pulling outward the resin foam of the intermediate layer at a front surface thereof fixed to the upper layer is higher than the force thereof at a back surface fixed to the lower layer, and the shearing force operates on the resin foam of the intermediate layer, so that the component of force for pulling the intermediate layer upward is generated. Thus, the restoring property of the cushion member is improved to reduce the creases during no load application, and the permanent setting is prevented and the stroke characteristic (compressive characteristic) in the thickness direction is apparently increased. By using this as a cushion member for the seat structure, the number of spring members to be used, such as the coil springs, can be reduced, which contributes to the simplification of the structure of the entire seat structure and cost reduction.

The cushion member is preferably stretched in a tense state between the frames while an end part thereof is bent so that the upper layer at the end part comes to the front side and the lower layer at the end part comes to the back side. Thus, the circumference of the upper layer becomes longer than that of the lower layer in the stretching state, so that the above operation and effect can be obtained easily.

DESCRIPTION OF PREFERRED EMBODIMENT

Figure 1:
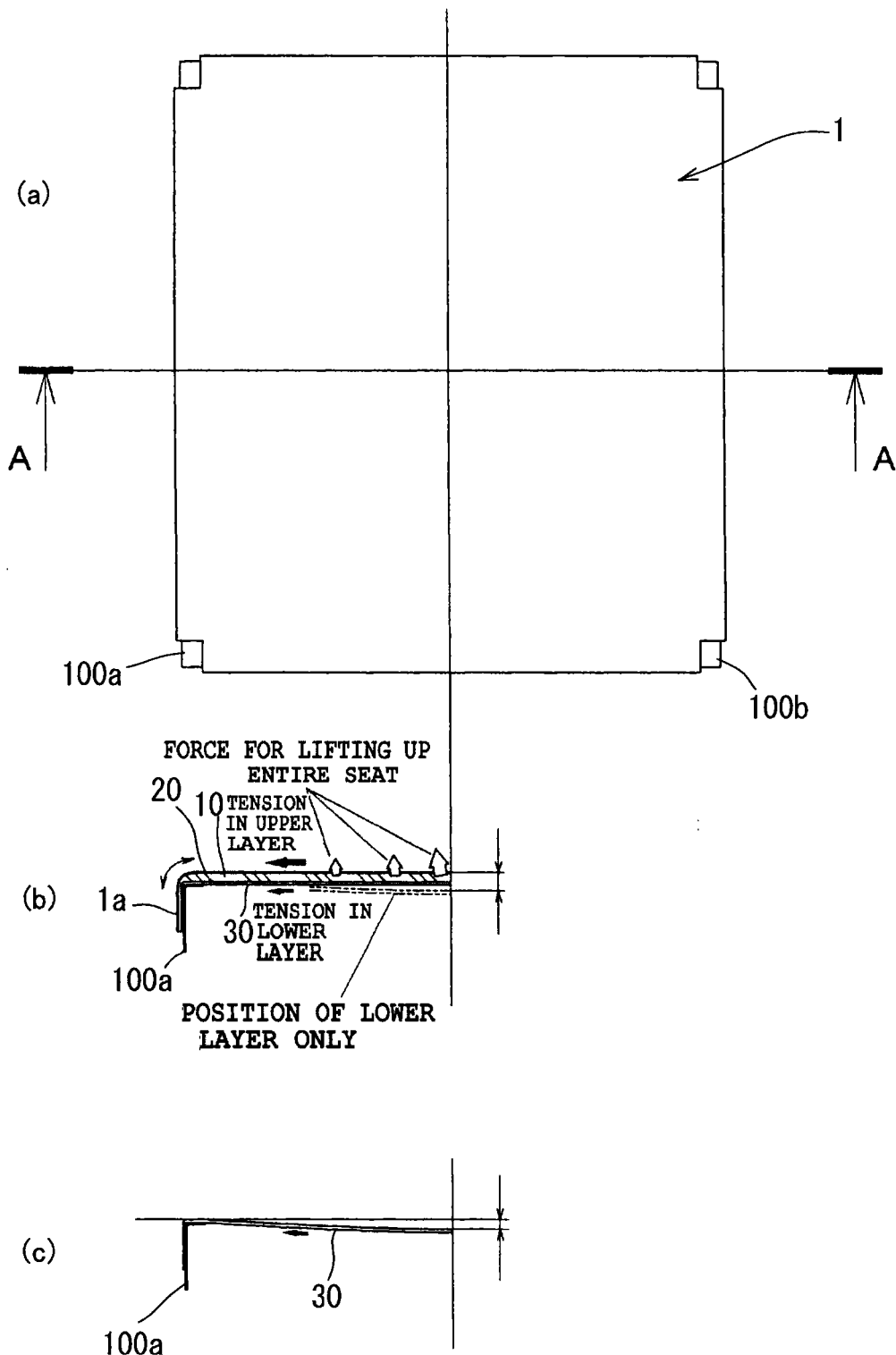
FIG. 1A is a plan view depicting a cushion member according to an aspect of an embodiment of the present invention.
FIG. 1B is a sectional view taken along A-A of FIG. 1A.
FIG. 1C is an explanatory view of a state in which only a lower layer is stretched.
Figure 2:
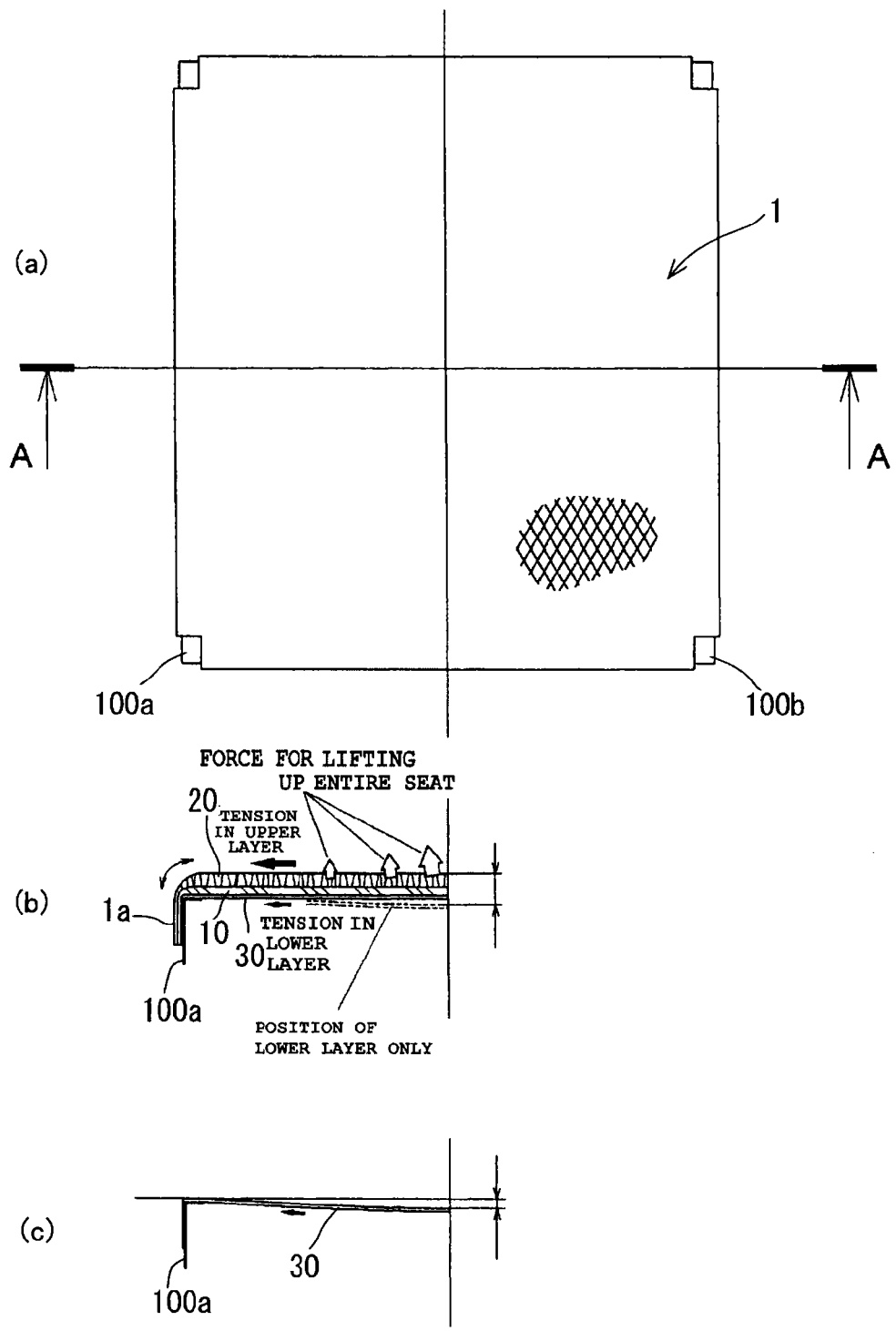
FIG. 2A is a plan view depicting a cushion member according to another aspect of the embodiment of the present invention.
FIG. 2B is a sectional view taken along A-A of FIG. 2A.
FIG. 2C is an explanatory view of a state in which only the lower layer is stretched.

The present invention is hereinafter described in detail based on an embodiment of the present invention with reference to the drawings. FIG. 1 and FIG. 2 are diagrams depicting a cushion member 1 according to an embodiment of the present invention. This cushion member 1 has a three-layer structure in which an intermediate layer 10 is held between an upper layer 20 and a lower layer 30.

The intermediate layer 10 is made of resin foam such as polyurethane foam. The intermediate layer 10 is formed with a thickness of approximately 2 to 10 mm, for example.

The upper layer 20 is made of two-dimensional or three-dimensional cloth, which may correspond to woven fabric, nonwoven fabric, knit, leather, or synthetic leather. Note that FIG. 1 depicts an aspect of using two-dimensional cloth as the upper layer 20, and FIG. 2 depicts an aspect of using three-dimensional cloth (three-dimensional knitted fabric) as the upper layer 20.

In a manner similar to the upper layer, the lower layer 30 is made of two-dimensional or three-dimensional cloth, which may correspond to woven fabric, nonwoven fabric, knit, leather, or synthetic leather.

The upper layer 20 preferably has higher expandability (higher restoring force) in the plane direction than the lower layer 30.

Figure 3:
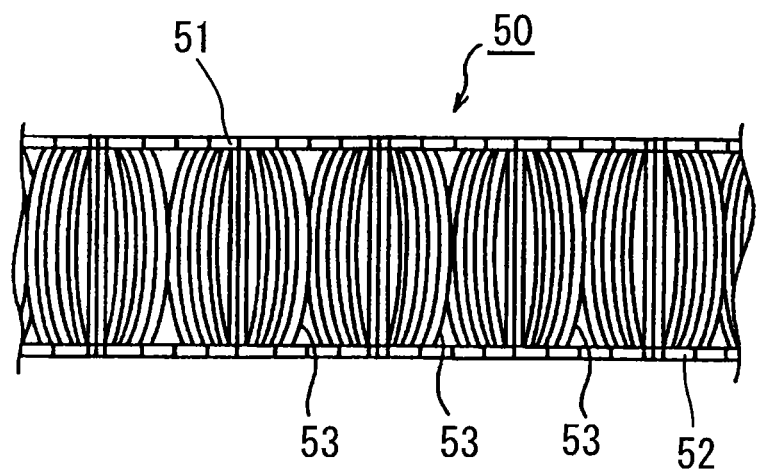
FIG. 3 is an explanatory view of a structure of a three-dimensional knitted fabric.

As the three-dimensional cloth applicable to the upper layer 20 or the lower layer 30, for example, a three-dimensional knitted fabric 50 as disclosed in Japanese Unexamined Patent Application Publication No. 2002-331603 may be used. The three-dimensional knitted fabric 50 has a stereoscopic, three-dimensional structure including a pair of ground knits 51 and 52 disposed apart from each other, and a number of connecting strands 53 for connecting the pair of ground knits 51 and 52 by going back and forth between the both as depicted in FIG. 3.

Figure 4:
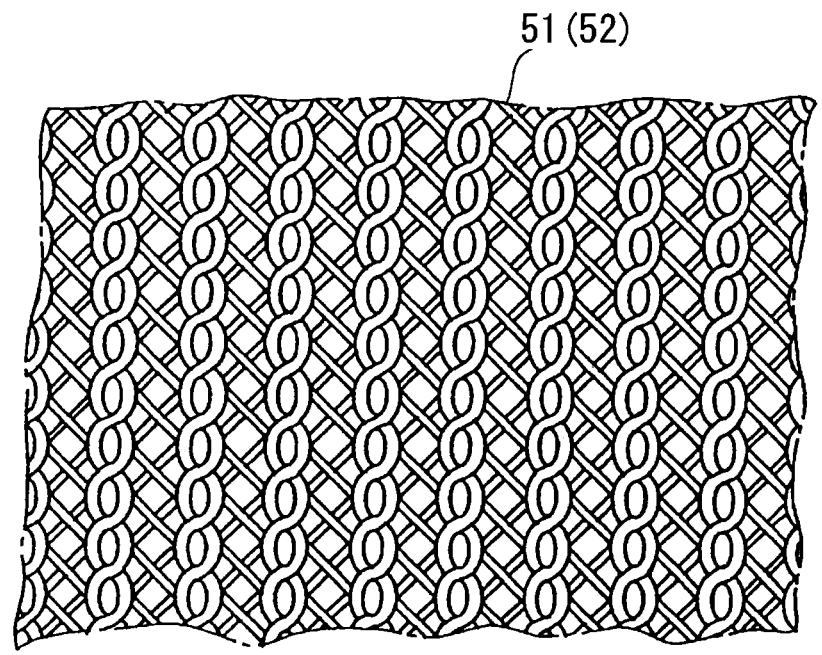
FIG. 4 is a diagram depicting one example of a knit texture of a ground knit.
Figure 5:
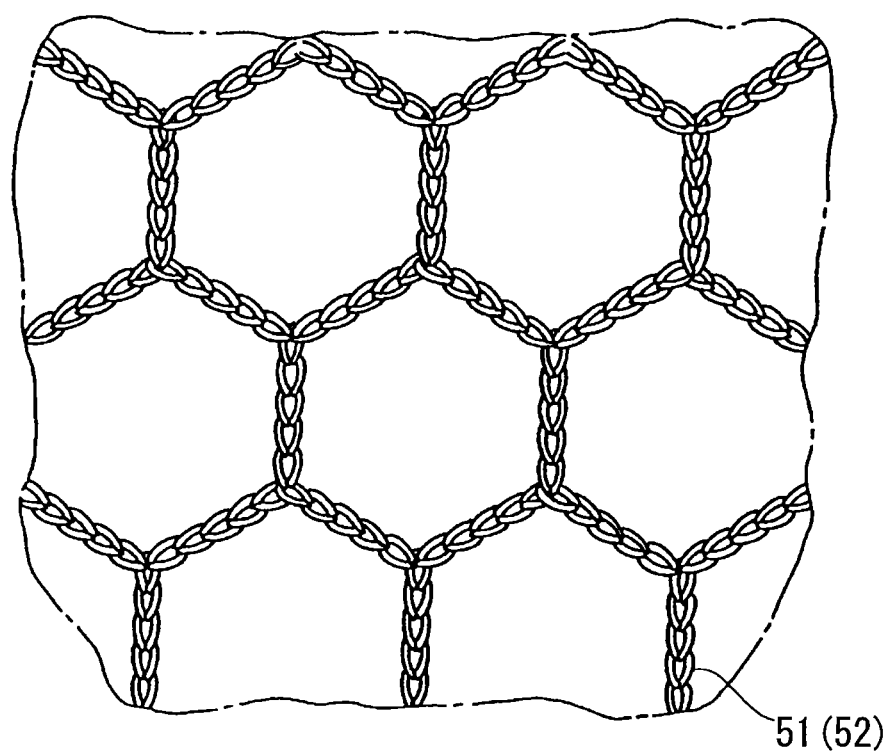
FIG. 5 is a diagram depicting another example of the knit texture of the ground knit.

As each of the ground knits 51 and 52, for example, the knit formed by a flat knit texture (narrow one) which is continuous in both a wale direction and a course direction from strands obtained by twisting single fiber (see FIG. 4) or the knit formed in a stitch structure having a honeycomb-like (hexagonal) mesh from strands obtained by twisting single fiber (see FIG. 5) is employed. Needless to say, these knit textures are optional, and the knit texture other than those having the narrow texture or the honeycomb-like texture may be employed, or the two ground knits 51 and 52 may be a different knit texture from each other or may have the same knit texture; this combination is arbitrarily selected. However, if the surface of the stitch of the honeycomb-like texture is used as the surface to be fixed with the intermediate layer 10, during the lamination and fixture of the intermediate layer 10 by a frame lamination process as later described, the intrusion of a part of the molten polyurethane foam or an adhesive used for adhesion is easily allowed. The stiffness of the three-dimensional knitted fabric can be adjusted by using the honeycomb-like texture, which is relatively rough, or the dense texture like the narrow texture. In the present invention, by the lamination of the intermediate layer 10, the stiffness as a whole is increased; however, when the relatively rough texture like the honeycomb-like texture is employed, if the strands to be used are the same material, a softer three-dimensional knitted fabric with sufficient fitting feeling can be formed.

Figure 6:
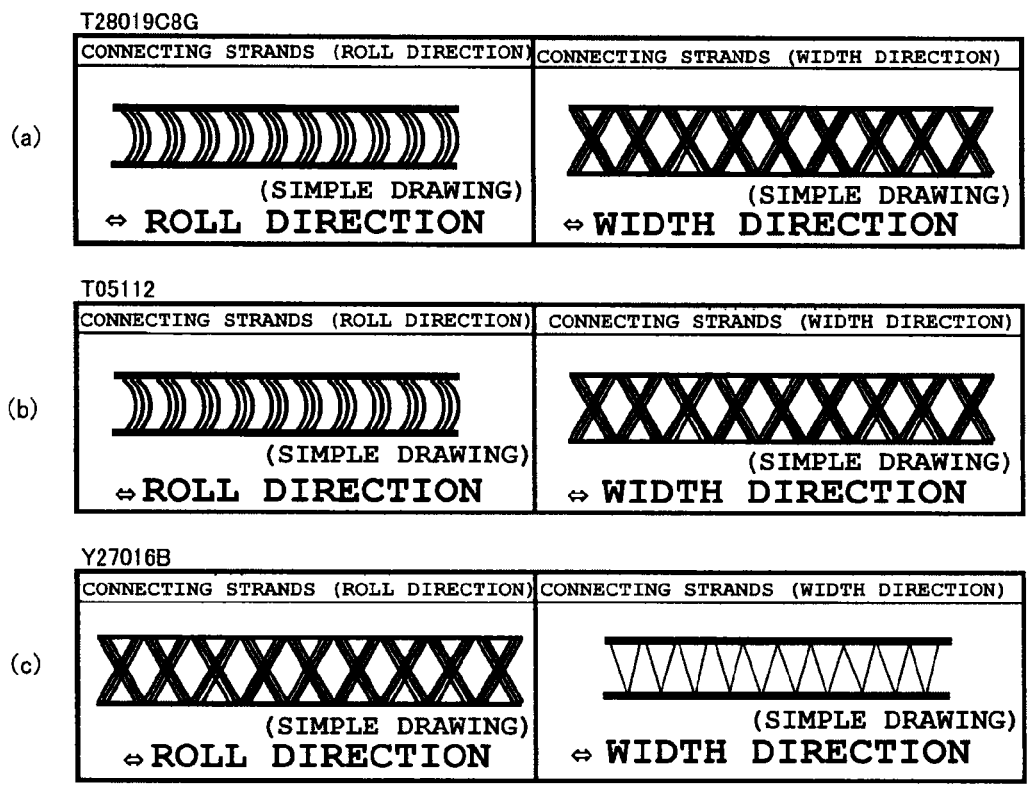
FIGS. 6A to 6C depict an example of how connecting strands are arranged.

The connecting strands 53 are woven between the two ground knits 51 and 52 so that one ground knit 51 and the other ground knit 52 keep a predetermined distance therebetween, and may be either monofilament or multifilament. Even if a multifilament with a softer spring property than the monofilament is used, predetermined stiffness can be provided by allowing a part of the intermediate layer 10 to intrude into the three-dimensional knitted fabric. The connecting strands 53 can be arranged by going back and forth between the ground knits 51 and 52 (pile texture) in various ways, such as forming a letter of X or a straight form. FIGS. 6A to 6C depict examples thereof. FIGS. 6A to 6C depict how the connecting strands 53 are arranged in the three-dimensional knitted fabric used in the test examples, which are described later, and the left part of each drawing is a sectional view taken along a roll direction (a winding direction of a roll of the three-dimensional knitted fabric), and the right part of each drawing is a sectional view taken along a width direction orthogonal to the roll direction.

The material of the ground strands forming the ground knits 51 and 52 or the connecting strands 53 includes, but not particularly limited to, for example, synthetic fiber such as polypropylene, polyester, polyamide, polyacrylonitrile, or rayon, or natural fiber such as regenerated fiber, wool, silk, or cotton is given. Any of these materials may be used alone or may be used in combination with another as appropriate. Preferably, thermoplastic polyester-based fiber typified by polyethylene terephthalate (PET) or polybutylene terephthalate (PBT), polyamide-based fiber typified by nylon 6 or nylon 66, polyolefin-based fiber typified by polyethylene or polypropylene, or fiber obtained by combining two or more kinds of these is used. The polyester-based fiber is preferable because of having excellent recyclability. The shape of the ground strands or the connecting strands is not limited, and may be the strands having a circular section or a variant section, for example.

The upper layer 20 and the front surface side of the intermediate layer 10, and the lower layer 30 and the back surface side of the intermediate layer 10 are fixed to each other by adhesion or a frame lamination process, for example. At the fixture, a part of the intermediate layer 10 in the thickness direction intrudes into a gap between the strands of the cloth included in the upper layer 20 or the lower layer 30 to be fixed thereto, so that the connection force between the strands included in the upper layer 20 or the lower layer 30 is provided with elasticity. As a result, the spring characteristic (spring constant) due to the tension, compressive force, and tensile strength increases, which is preferable. For achieving this, the frame lamination process is preferably employed. According to the frame lamination process, a part of the polyurethane foam included in the intermediate layer 10 can be molten utilizing the difference in melting point; while the molten part intrudes into the gap between the strands of the upper layer 20 and the lower layer 30, the fixture can be easily performed.

In the case of using the three-dimensional knitted fabric 50 as the upper layer 20 and the lower layer 30, the polyurethane foam as the intermediate layer 10 intrudes into the gap between the strands and is then solidified. On this occasion, the polyurethane foam preferably intrudes into the gap, in the three-dimensional knitted fabric 50, from the one ground knit 51 side adjacent to the intermediate layer 10 and does not reach the gap between the strands of the other ground knit 52. More preferably, the amount of intrusion is in the range of ⅓ to ⅔ of the total thickness of the three-dimensional knitted fabric 50 from the one ground knit 51 side adjacent to the intermediate layer 10. If the polyurethane foam as the intermediate layer 10 is allowed to intrude to reach the other ground knit 52, the spring characteristic at the compression in the thickness direction becomes too hard, resulting in that creases or the like are easily caused on the surface. However, if the lamination is performed in the above range, the compression characteristic becomes higher than that when the three-dimensional knitted fabric 50 or the polyurethane foam is used alone, and the other ground knit 52 and the connecting strands 53 of the three-dimensional knitted fabric 50 not integrated with the polyurethane foam have their own compressive characteristic function due to the operation of their own spring characteristic and the inclination of the connecting strands 53 operates to increase the tensile characteristic. As a result, in order to obtain the same tensile characteristic as the tensile characteristic obtained by using the three-dimensional knitted fabric 50 alone, according to the lamination structure of this embodiment, the fabric with lower tensile characteristic than the single three-dimensional knitted fabric 50 (for example, the knitted fabric using not the monofilament but the multifilament as the connecting strands 53) can be employed as the three-dimensional knitted fabric 50, which contributes to the manufacturing cost reduction. This point similarly applies to the case of using two-dimensional cloth or other three-dimensional cloth than the three-dimensional knitted fabric 50.

In the case of fixing the upper layer 20 and the front surface side of the intermediate layer 10 and fixing the lower layer 30 and the back surface side of the intermediate layer 10 through adhesion, the fixture is preferably performed by having the adhesive intrude into the gap between the strands of the cloth included in the upper layer 20 and the lower layer 30.

In this embodiment, the cushion member 1 described above is provided as the tensile structure by being stretched between the arbitrary frames disposed apart from each other by a predetermined distance. The arbitrary frames refer to, in the case of using the cushion member 1 for the seat structure, the frames constituting the seat cushion part (for example, a pair of side frames, or a frame disposed in the vicinity of a front end part and a frame disposed in the vicinity of a back end part), or frames constituting a seat back part (for example, a pair of side frames, or a frame disposed in the vicinity of an upper end part and a frame disposed in the vicinity of a back end part). Alternatively, the cushion member 1 can be used as the cushion member constituting a head rest part, an arm rest part, or an ottoman part in a manner that the cushion member 1 is stretched between the arbitrary frames constituting the head rest part, the arm rest part, or the ottoman part.

In this case, end parts 1a to 1d of the cushion member 1 in the stretched direction are bent and fixed to frames to which the cushion member 1 is stretched, for example, side frames 100a and 100b of the seat cushion part so that the upper layer 20 faces the front side and the lower layer 30 faces the back side at the end parts 1a and 1b as depicted in FIG. 1B and FIG. 2B. Thus, at the bent part, the circumference of the upper layer 20 becomes longer than the circumference of the lower layer 30. As a result, the tension of the upper layer 20 in the plane direction is increased to be larger than the tension of the lower layer 30 in the plane direction. In the case of stretching only the lower layer 30 between the side frames 100a and 100b as depicted in FIG. 1C and FIG. 2C, the shape (degree of tension) is maintained by just the balance between the weight of the lower layer 30 alone and the tension of the lower layer 30 in the plane direction; therefore, it is likely that the cushion member goes downward with the vicinity of the center as the center. However, according to this embodiment, since the tension of the upper layer 20 in the plane direction is larger than that of the lower layer 30, the front surface side of the intermediate layer 10 adjacent to the upper layer 20 is pulled outward more than the back surface side thereof, so that compression and shear force is caused in the intermediate layer 10 (oblique lines in the intermediate layer 10 in FIG. 1B and FIG. 2B represent the state and the direction where the shear force operates to deform the intermediate layer 10), so that the component of force for lifting up the cushion member 1 is generated. Therefore, according to the present embodiment, the stroke characteristic in the thickness direction of the cushion member 1 (compressive characteristic) is improved.

Test Example 1

Figure 7:
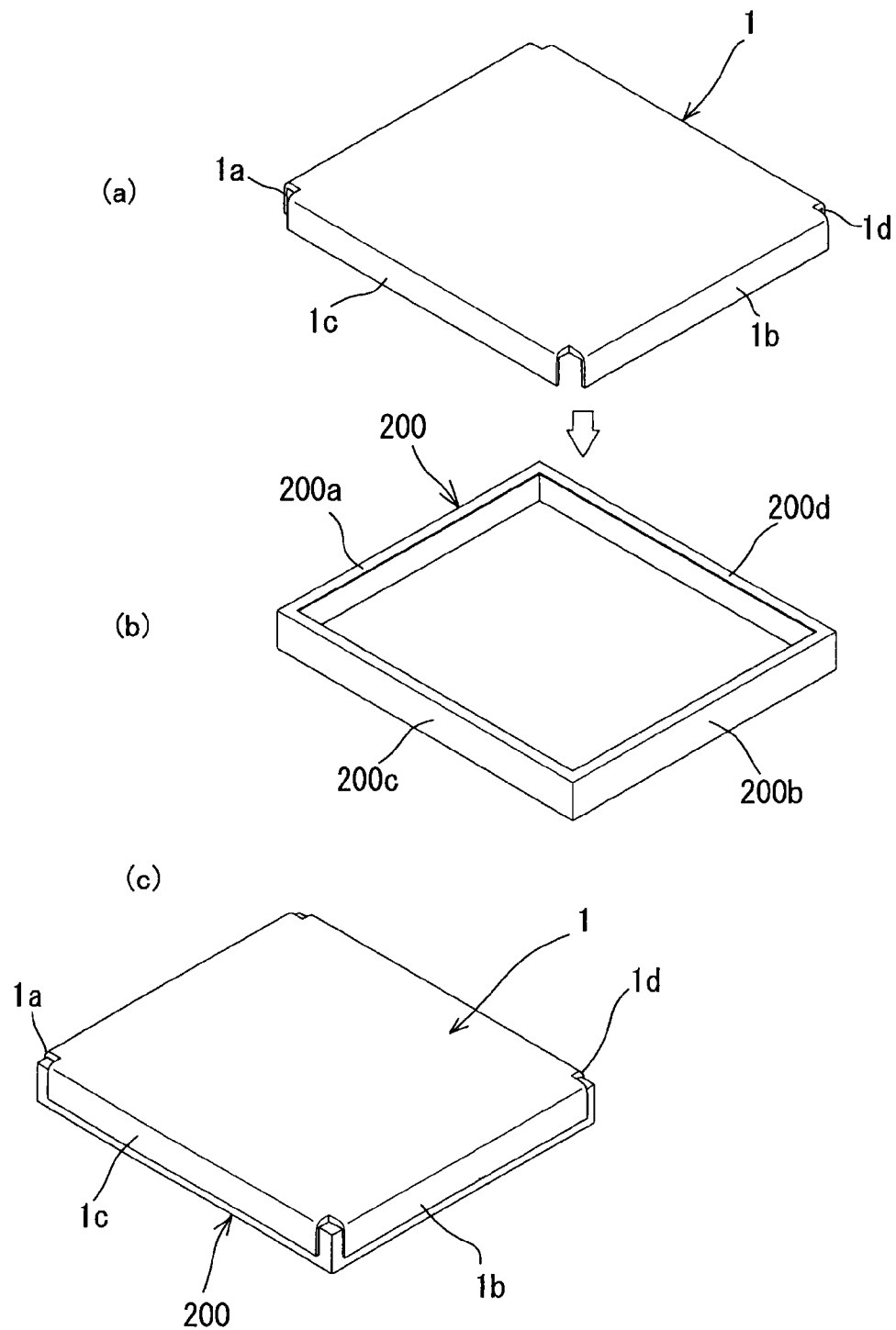
FIGS. 7A and 7B are diagrams for describing a testing method in a test example.

The cushion member 1 was stretched for a fixture 200 having frames 200a to 200d, which is like an approximate square when viewed from above, as depicted in FIG. 7. Specifically, as depicted in FIG. 7, the end parts 1a to 1d along the four sides of the cushion member 1 were fixed to the frames 200a to 200d of the fixture 200, respectively, so that the upper layer 20 faced the front side and the lower layer 30 faced the back side at the end parts 1a to 1d. Note that the cushion member 1 was stretched in a tense state for the frames 200a to 200d with an expansion ratio of 5% or less.

In the test example 1, the member with the structure illustrated in FIG. 1 was used as the cushion member 1. In other words, in the cushion member 1, the upper layer 20 and the lower layer 30 were stacked on the front surface side and the back surface side of the intermediate layer 10 including polyurethane foam with a thickness of 3 mm or 5 mm (hardness: 83.5 N, density: 0.02 g/cm$^3$), respectively, and the two-dimensional cloth with a thickness of 1 mm (product number: C009A, manufactured by SEIREN Co., Ltd.) was used as the upper layer 20. As the lower layer 30, a three-dimensional knitted fabric (product number: T27016B, manufactured by Asahi Kasei Corporation) with a thickness of 5 mm and a two-dimensional knitted fabric (product number: Y27013NP, manufactured by Asahi Kasei Corporation) with a thickness of 1 mm were prepared. The upper layer 20 and the lower layer 30 were integrated with the front surface side and the back surface side of the intermediate layer 10 through adhesion, respectively. The cushion member including the three-dimensional knitted fabric (product number: T27016B) with a thickness of 5 mm as the lower layer 30 was attached by applying the adhesive so that the adhesive intrudes between the strands of one ground knit of the three-dimensional knitted fabric.

Figure 8:
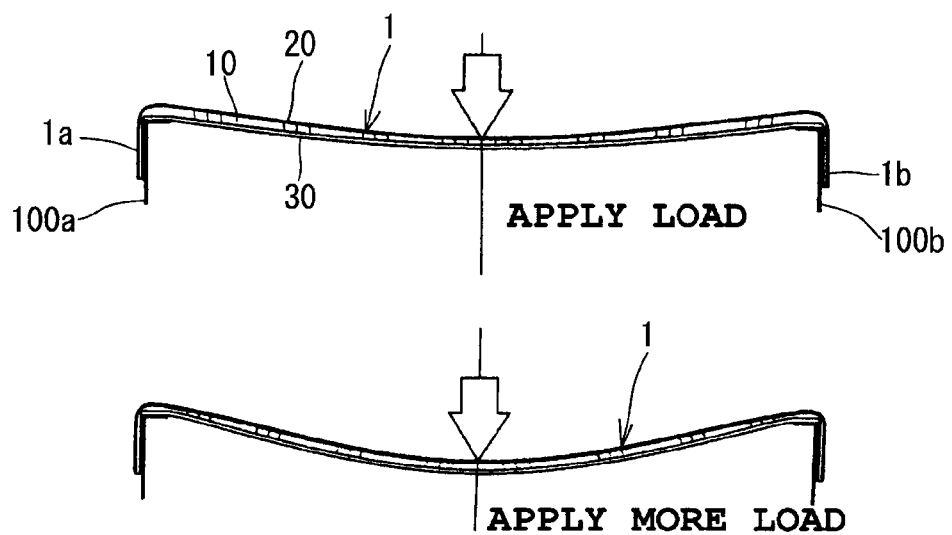
FIGS. 8A and 8B are diagrams for describing a method of a test example 1 for testing the cushion member with the structure illustrated in FIG. 1.

In this test, as depicted in FIG. 8, the load-displacement characteristic was measured in the case where the load was applied up to 100 N with a circular pressure plate with a diameter of 30 mm or a diameter 98 mm abutting on the vicinity of the center of the cushion member 1 and the case where the load was applied up to 1000 N with a circular pressure plate with a diameter of 200 mm abutting thereon (oblique lines in the intermediate layer 10 in FIG. 8 represent the state and the direction where the shear force operates to deform the intermediate layer 10). The results are shown in FIG. 10 to FIG. 15.

Figure 10:
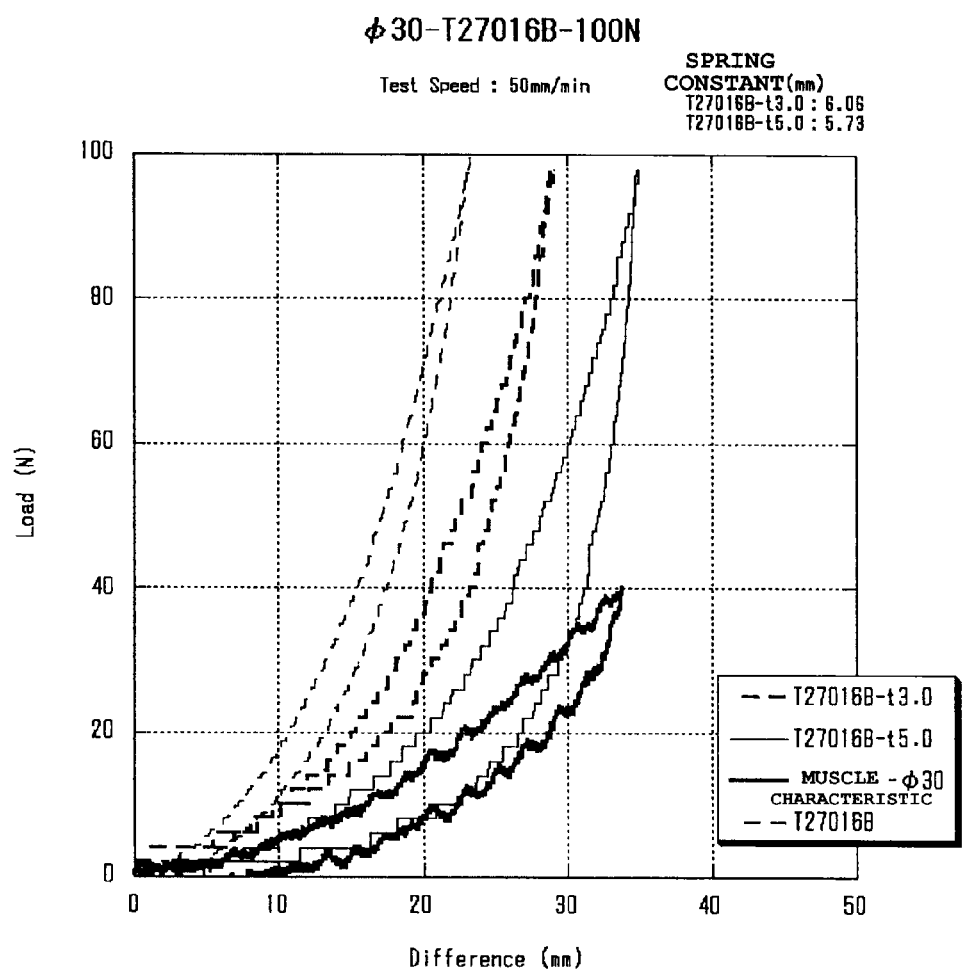
FIG. 10 is a diagram for showing the load-deflection characteristic obtained by pressing a cushion member having the lower layer of product number: T27016B with a pressure plate with a diameter of 30 mm in the test example 1.
Figure 11:
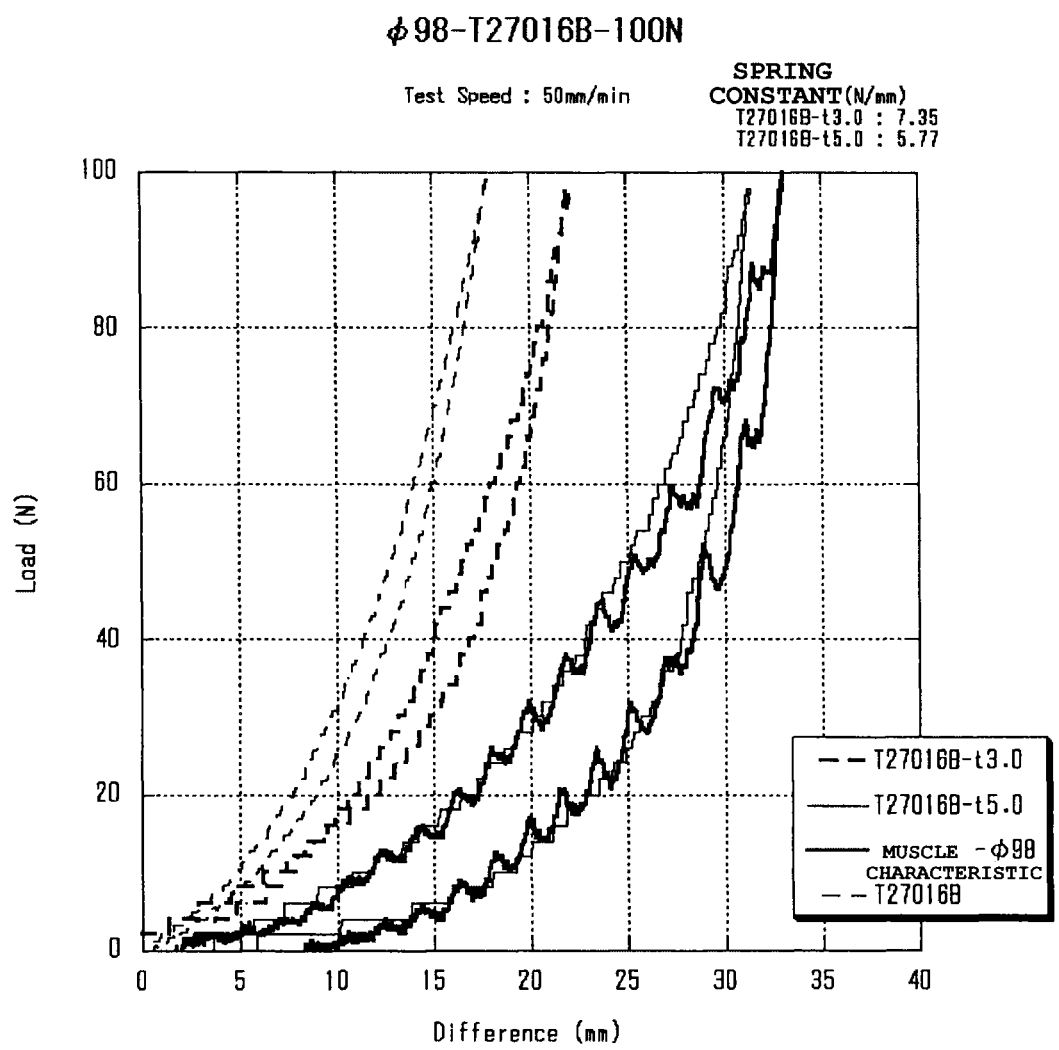
FIG. 11 is a diagram for showing the load-deflection characteristic obtained by pressing a cushion member having the lower layer of product number: T27016B with a pressure plate with a diameter of 98 mm in the test example 1.
Figure 12:
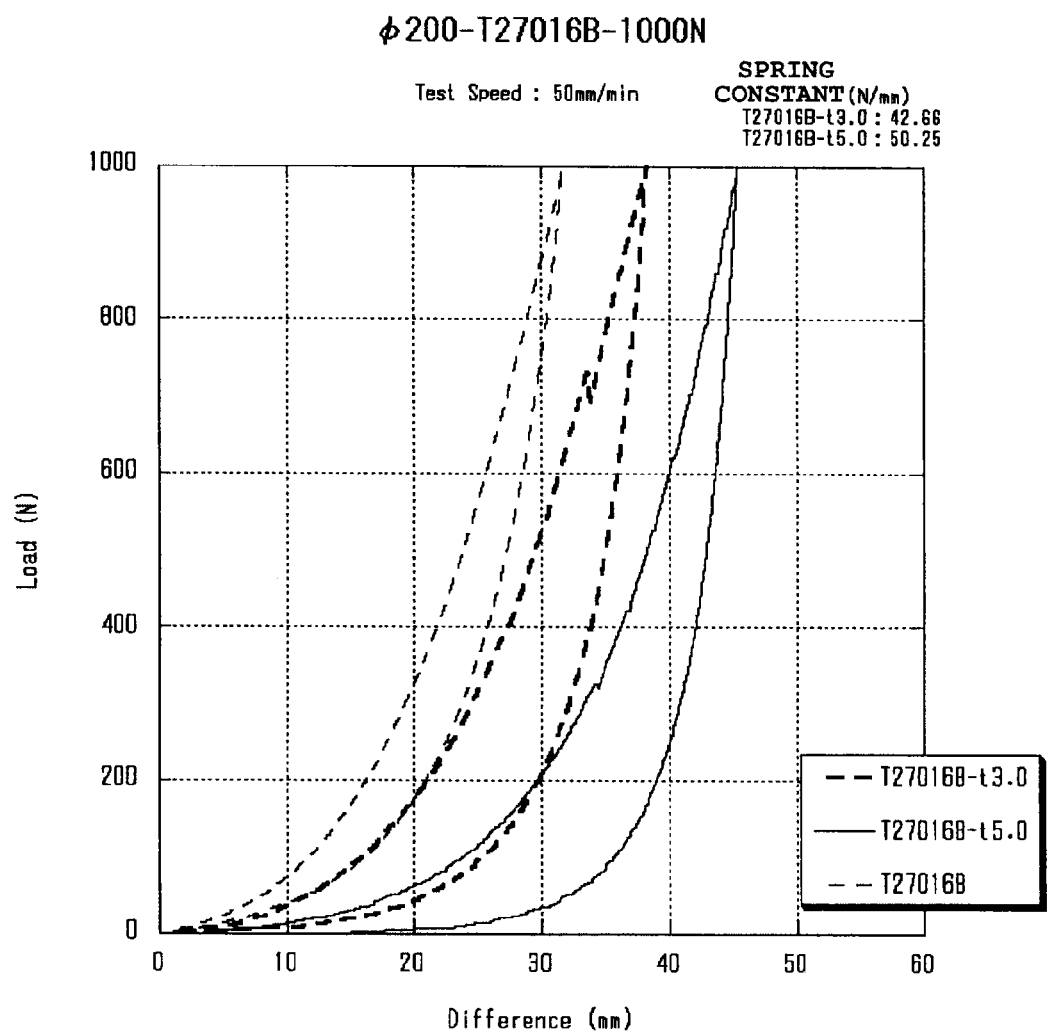
FIG. 12 is a diagram for showing the load-deflection characteristic obtained by pressing a cushion member having the lower layer of product number: T27016B with a pressure plate with a diameter of 200 mm in the test example 1.

First, FIG. 10 to FIG. 12 show the data obtained by applying pressure with the pressure plate with the product number T27016B used as the lower layer 30, in which the reference symbol "T27016B-t3.0" represents the data obtained by using 3 mm thick polyurethane foam as the intermediate layer 10 and the reference symbol "T27016B-t5.0" represents the data obtained by using 5 mm thick polyurethane foam as the intermediate layer 10. Further, the reference symbol "T27016B" represents the data obtained by stretching the three-dimensional knitted fabric (product number: T27016B) alone for the fixture 200. The "muscle characteristic" represents the data when the buttock on one side of a male in his 40's is pressed by a pressure plate.

As a result of comparing the strokes obtained by applying pressure with a pressure plate with a diameter of 30 mm in FIG. 10, the strokes were 22.5 mm for "T27016B", 29.5 mm for "T27016B-t3.0", and 35 mm for "T27016B-t5.0". An increase in thickness of 4 mm or 6 mm in comparison with the three-dimensional knitted fabric alone, which was obtained by adding the thickness of 1 mm of the upper layer 20 to the thickness of 3 mm or 5 mm of the polyurethane foam, resulted in an increase in stroke of 7 mm, 12.5 mm.

This has proved that the stroke characteristic increased more than the thickness of the intermediate layer 10 by setting the tension of the upper layer 20 in the plane direction to be higher than that of the lower layer 30 via the intermediate layer 10; thus, the stroke characteristic can be improved, and a person can be comfortably seated with sufficient fitting feeling.

As a result of comparing the strokes obtained by applying pressure with a pressure plate with a diameter of 98 mm in FIG. 11, the strokes were 17 mm for "T27016B", 22 mm for "T27016B-t3.0", and 31 mm for "T27016B-t5.0". The stroke increased by 5 mm and 14 mm. As a result of comparing the strokes obtained by applying pressure with a pressure plate with a diameter of 200 mm in FIG. 12, the strokes were 31 mm for "T27016B", 38 mm for "T27016B-t3.0", and 45 mm for "T27016B-t5.0". The stroke increased by 7 mm and 14 mm. In any case, the stroke characteristic was improved.

Figure 13:
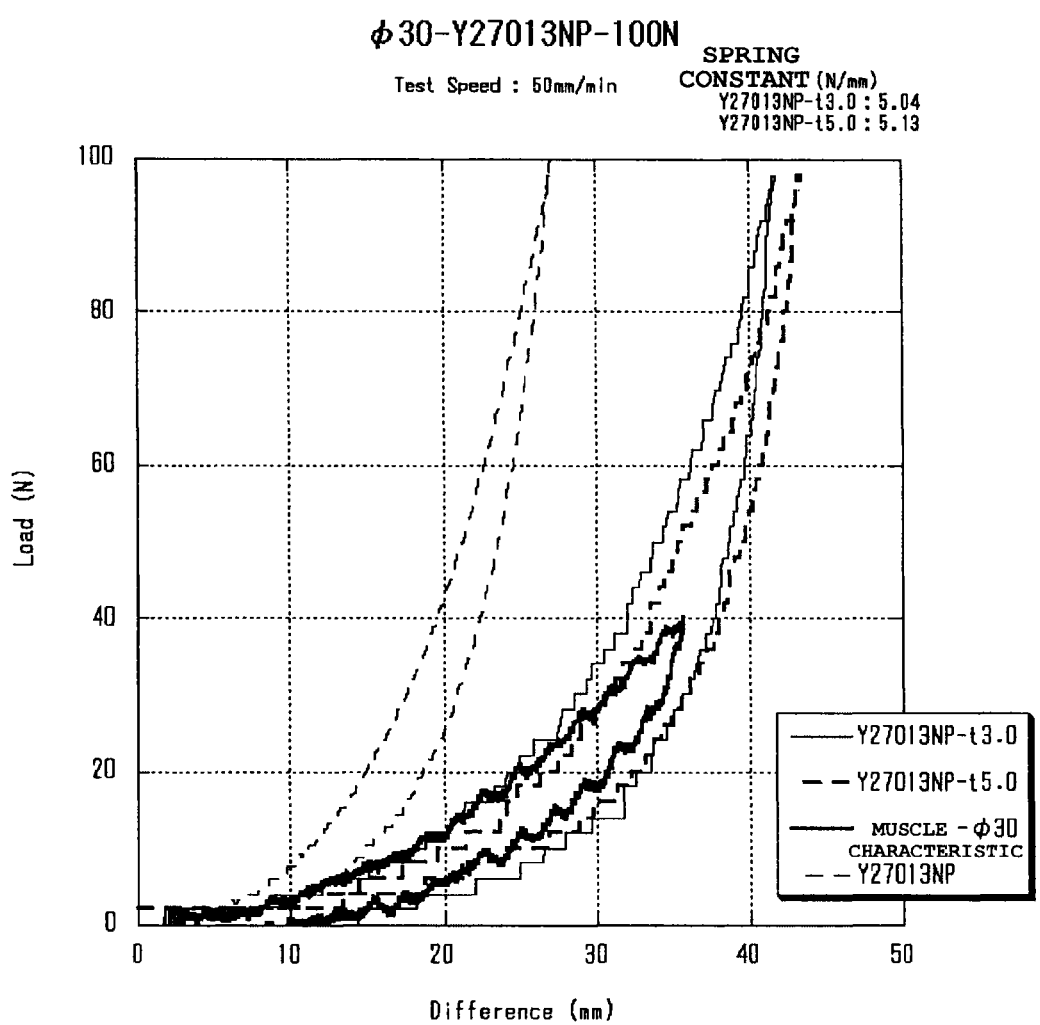
FIG. 13 is a diagram for showing the load-deflection characteristic obtained by pressing a cushion member having the lower layer of product number: Y27013NP with a pressure plate with a diameter of 30 mm in the test example 1.
Figure 14:
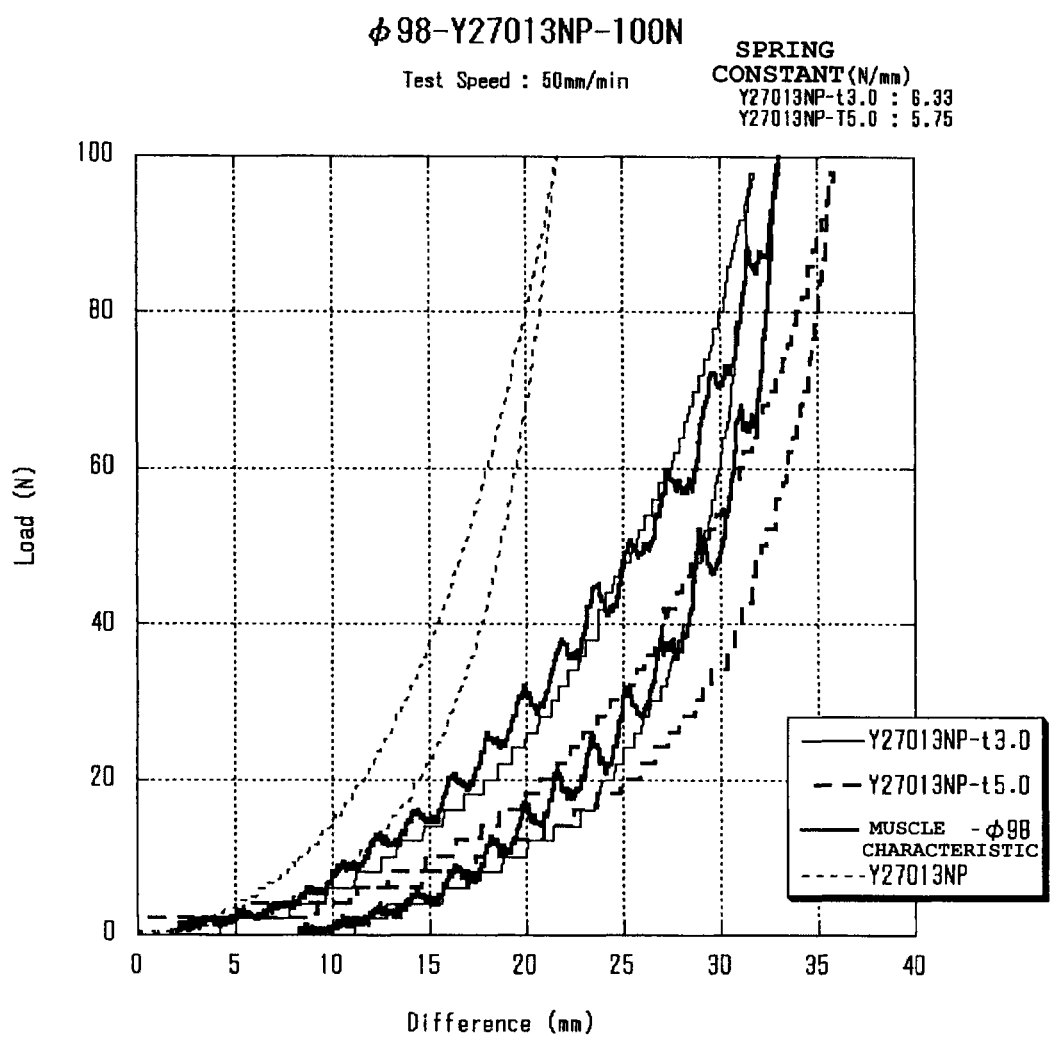
FIG. 14 is a diagram for showing the load-deflection characteristic obtained by pressing a cushion member having the lower layer of product number: Y27013NP with a pressure plate with a diameter of 98 mm in the test example 1.
Figure 15:
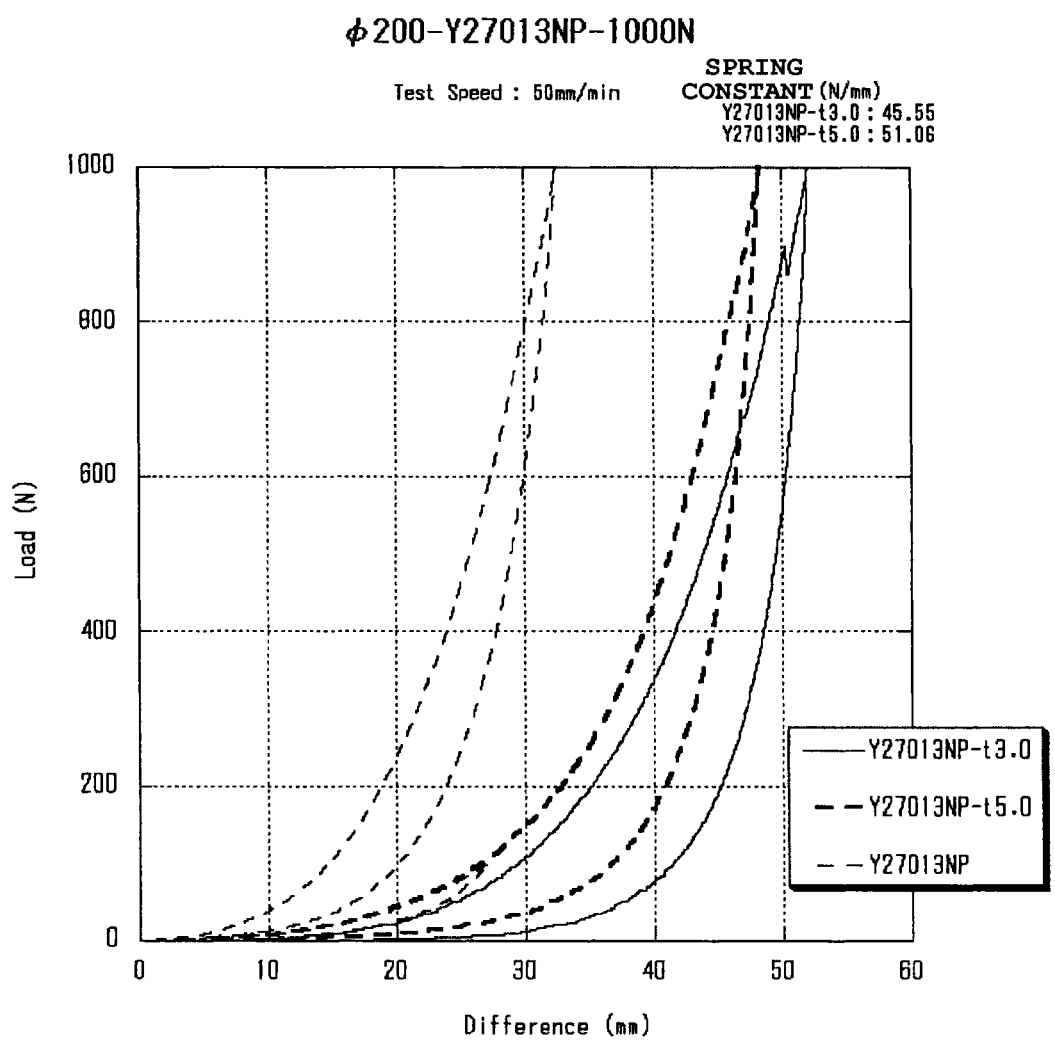
FIG. 15 is a diagram for showing the load-deflection characteristic obtained by pressing a cushion member having the lower layer of product number: Y27013NP with a pressure plate with a diameter of 200 mm in the test example 1.

FIG. 13 to FIG. 15 show the test results in the case of using the product number Y27013NP for the lower layer 30. Note that the reference symbol "Y27013NP-t3.0" represents the data when the polyurethane foam with a thickness of 3 mm is used as the intermediate layer 10, the reference symbol "Y27013NP-t5.0" represents the data when the polyurethane foam with a thickness of 5 mm is used as the intermediate layer 10, and the reference symbol "Y27013NP" represents the data obtained by stretching the two-dimensional cloth alone for the fixture 200.

As a result of comparing the strokes obtained by applying pressure with a pressure plate with a diameter of 30 mm in FIG. 13, the strokes were 27 mm for "Y27013NP", 41 mm for "Y27013NP-t3.0", and 42 mm for "Y27013NP-t5.0". The stroke increased by 14 mm and 15 mm.

As a result of comparing the strokes obtained by applying pressure with a pressure plate with a diameter of 98 mm in FIG. 14, the strokes were 22 mm for "Y27013NP", 32 mm for "Y27013NP-t3.0", and 36 mm for "Y27013NP-t5.0". The stroke increased by 10 mm and 14 mm.

As a result of comparing the strokes obtained by applying pressure with a pressure plate with a diameter of 200 mm in FIG. 15, the strokes were 32 mm for "Y27013NP", 52 mm for "Y27013NP-t3.0", and 48 mm for "Y27013NP-t5.0". The stroke increased by 20 mm and 16 mm.

Therefore, it is understood that even when the two-dimensional cloth is used for the lower layer 30, the stroke characteristic is improved more than the thickness of the intermediate layer 10 by setting the tension of the upper layer 20 in the plane direction to be higher than that of the lower layer 30 via the intermediate layer 10.

Test Example 2

In the test example 2, the load-deflection characteristic of the cushion member 1 with the structure depicted in FIG. 2, which employed the three-dimensional knitted fabric as the upper layer 20, was measured. In the test example 2, the three-dimensional knitted fabric constituting the upper layer 20 was the product number T28019C8G with a thickness of 7 mm manufactured by Asahi Kasei Corporation, and this three-dimensional knitted fabric was stacked and fixed to polyurethane foam (hardness: 83.5 N, density: 0.02 g/cm$^3$) with a thickness of 3 mm or 5 mm as the intermediate layer 10, which is similar to that of the test example 1. Here, the three-dimensional knitted fabric was fixed so that an adhesive intrudes between strands of the ground knit adjacent to the intermediate layer 10 in the three-dimensional knitted fabric constituting the upper layer 20. As for the lower layer 30, the three-dimensional knitted fabric used in the test example 1, product number "T27016B", was used. In the test example 2, the three-dimensional knitted fabric (T28019C8G) of the upper layer 20 and the three-dimensional knitted fabric (T27016B) of the lower layer 30 were stacked and fixed to the intermediate layer 10 so that their roll directions (winding direction of the roll of the three-dimensional knitted fabric) are orthogonal to each other.

Figure 9:
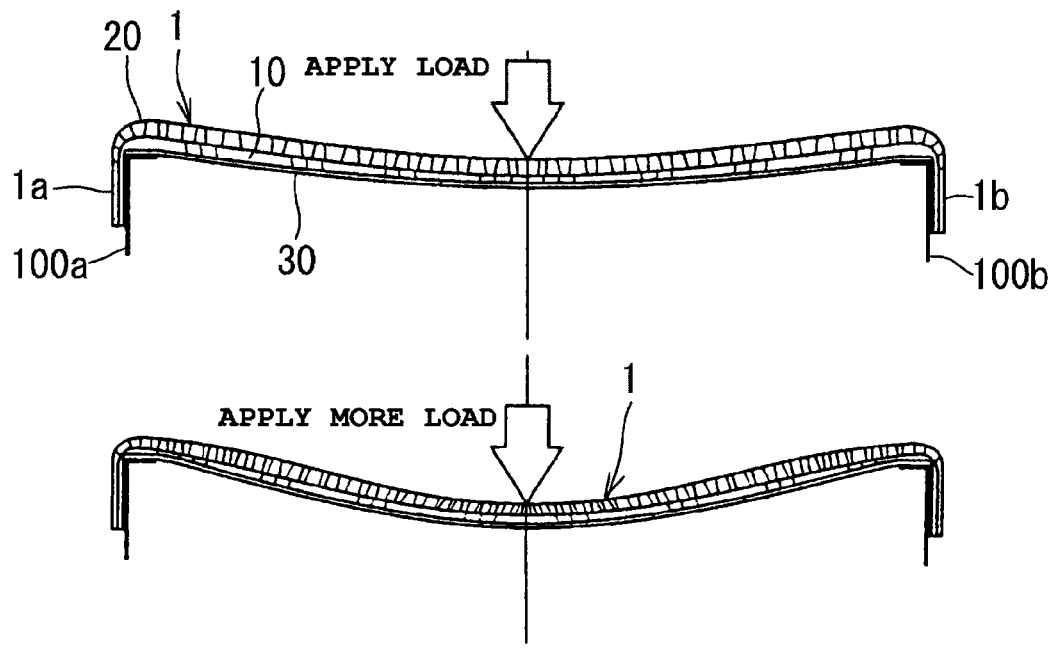
FIGS. 9A and 9B are diagrams for describing a method of a test example 2 for testing the cushion member with the structure illustrated in FIG. 2.
Figure 16:
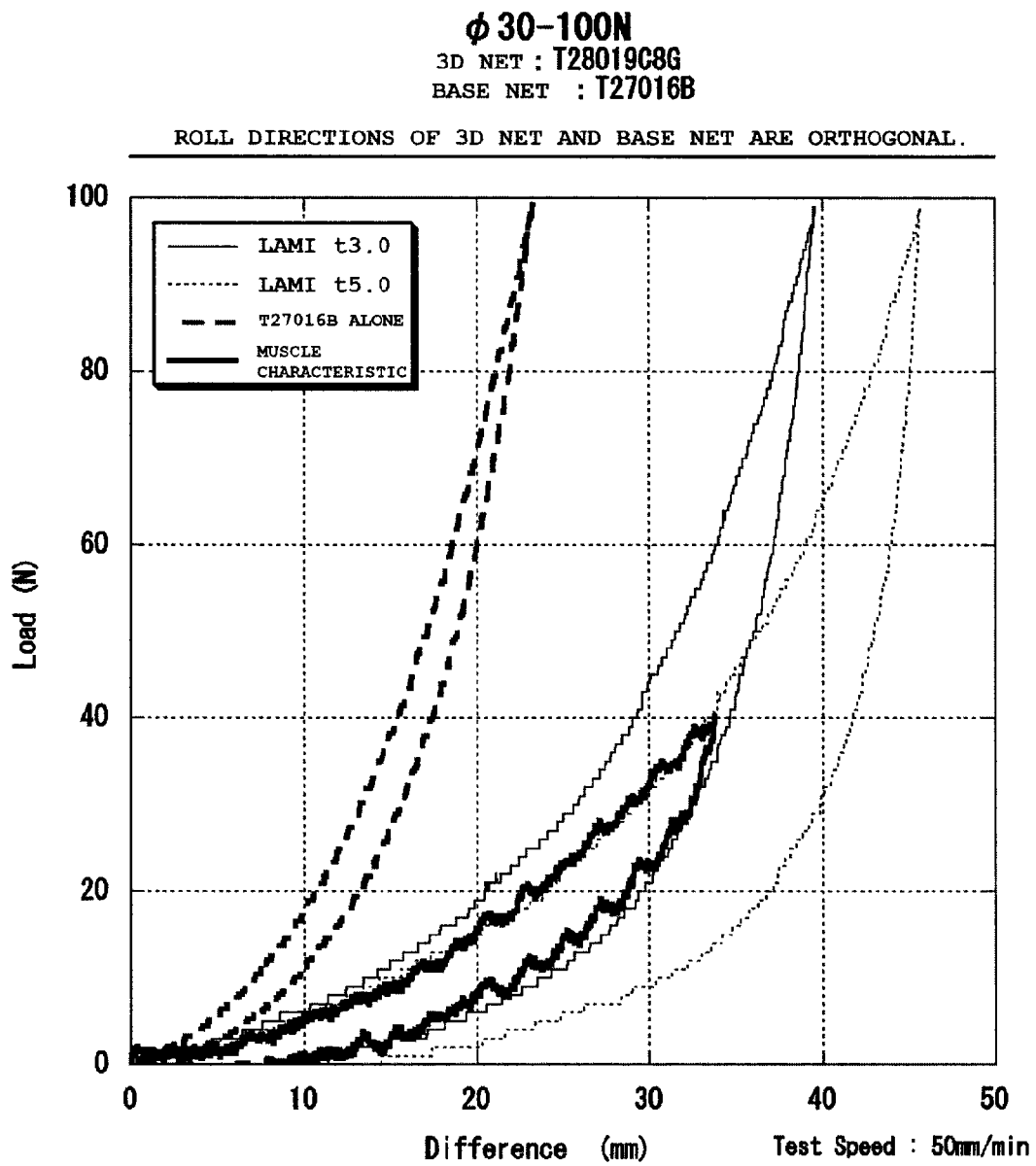
FIG. 16 is a diagram for showing the load-deflection characteristic obtained by pressing a cushion member with a pressure plate with a diameter of 30 mm in the test example 2.
Figure 17:
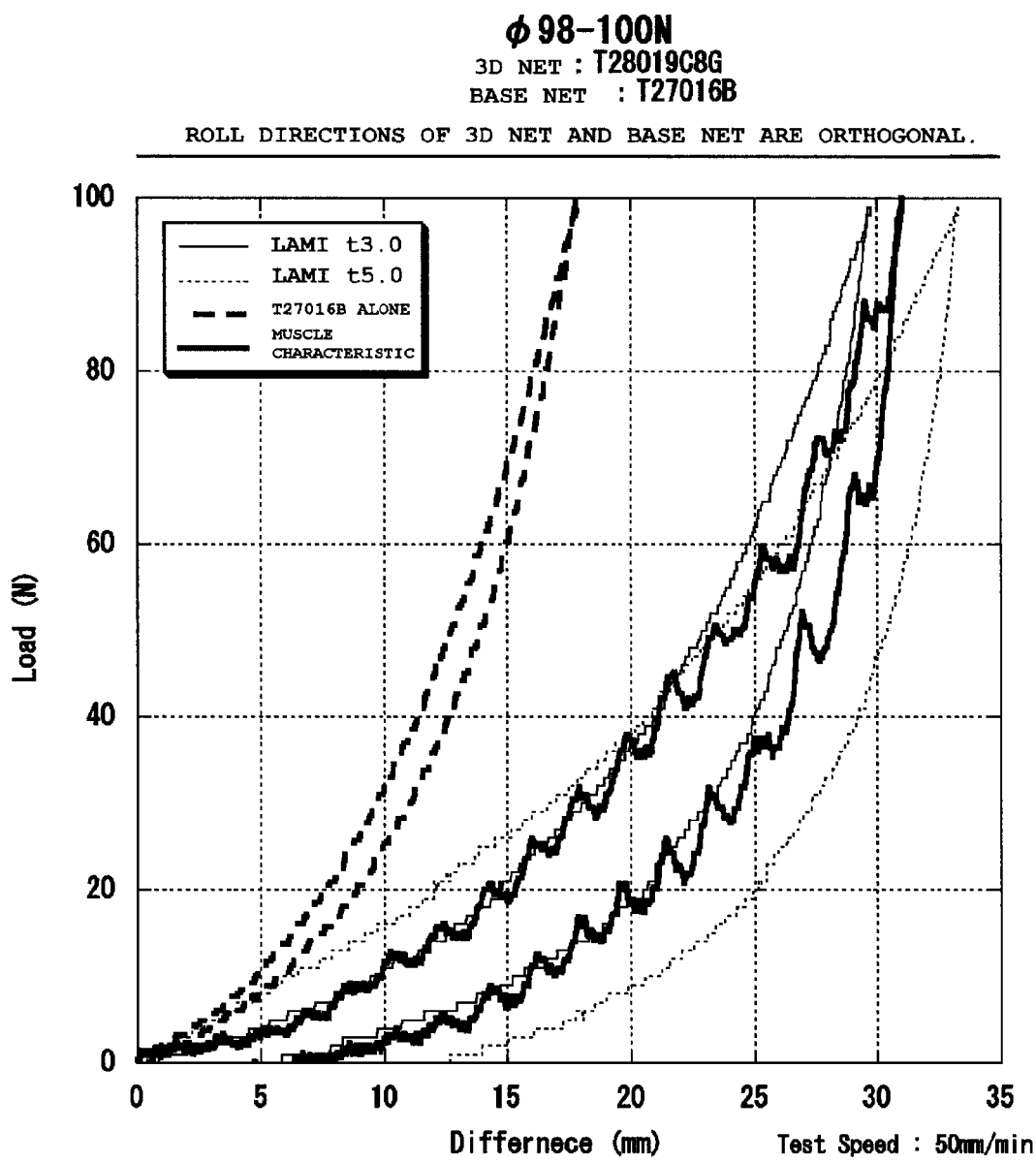
FIG. 17 is a diagram for showing the load-deflection characteristic obtained by pressing a cushion member with a pressure plate with a diameter of 98 mm in the test example 2.
Figure 18:
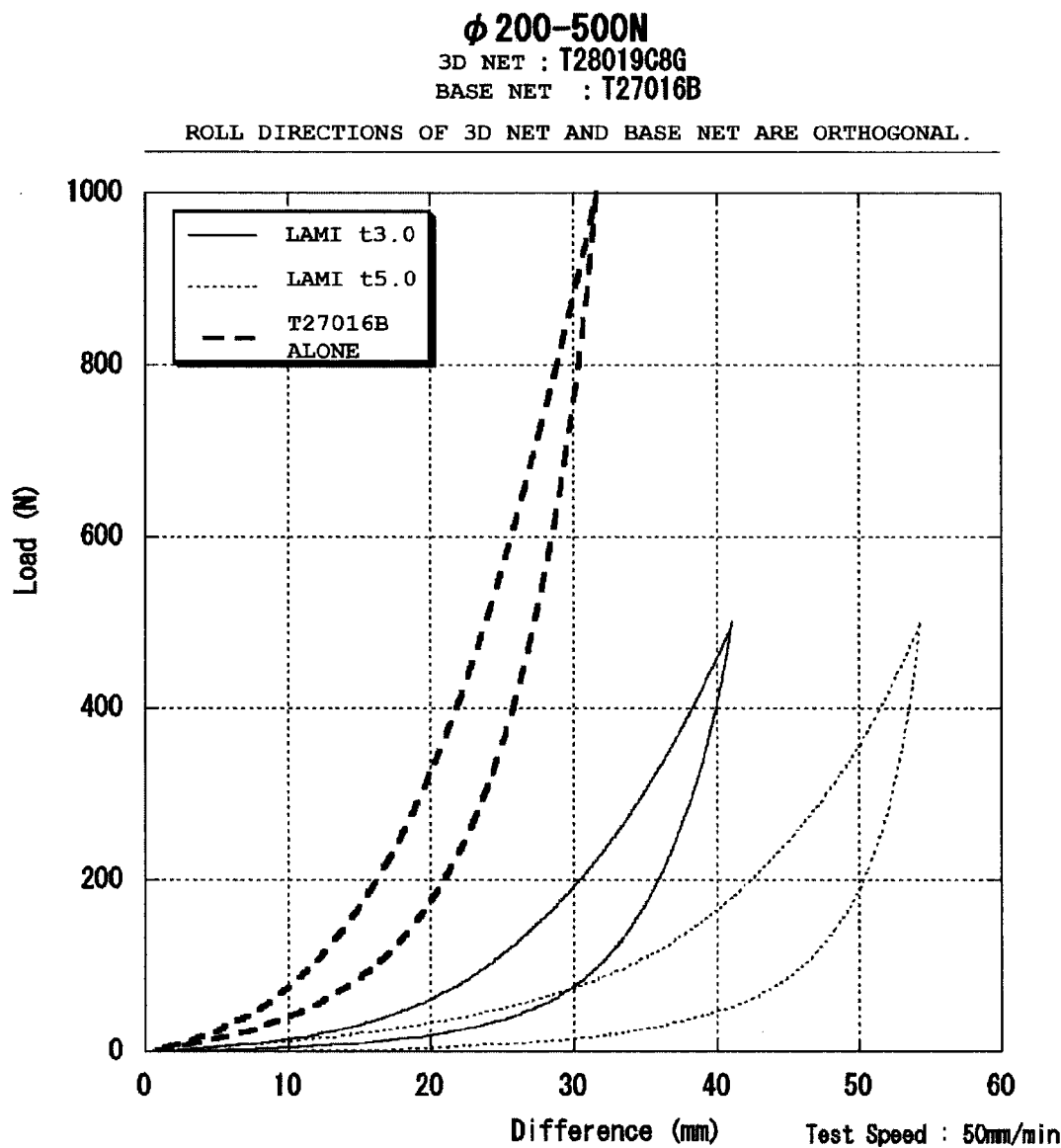
FIG. 18 is a diagram for showing the load-deflection characteristic obtained by pressing a cushion member with a pressure plate with a diameter of 200 mm in the test example 2.

In the test, as depicted in FIG. 9, the load-displacement characteristic was measured (oblique lines in the intermediate layer 10 of FIG. 9 represent the state and direction where the intermediate layer 10 is deformed due to the shear force) in the case where the load was applied up to 100 N by abutting a circular pressure plate with a diameter of 30 mm or a diameter of 98 mm in the vicinity of the center of the cushion member 1, and the case where the load was applied up to 500 N by abutting a circular pressure plate with a diameter of 200 mm in the vicinity of the center of the cushion member 1. The results are shown in FIG. 16 to FIG. 18. In the drawings, "lami t3.0" represents the data obtained by the stack on the 3 mm thick polyurethane foam, and "lami t5.0" represents the data obtained by the stack on the 5 mm thick polyurethane foam.

As a result of comparing the strokes obtained by applying pressure with a pressure plate with a diameter of 30 mm in FIG. 16, the stroke increased by approximately 17 mm for "lami t3.0" and approximately 23 mm for "lami t5.0" relative to the "T27016B" alone. As a result of comparing the strokes obtained by applying pressure with a pressure plate with a diameter of 98 mm in FIG. 17, the stroke increased by approximately 12 mm for "lami t3.0" and approximately 16 mm for "lami t5.0" relative to the "T27016B" alone. As a result of comparing the strokes obtained by applying pressure with a pressure plate with a diameter of 200 mm in FIG. 18, the stroke increased by approximately 10 mm for "lami t3.0" and approximately 22 mm for "lami t5.0" relative to the "T27016B" alone which was pressed up to 1000 N although the "lami t3.0" and "lami t5.0" were pressed up to 500 N. Therefore, in any case, it is understood that the stroke increased more than the thickness of the polyurethane foam constituting the intermediate layer 10, the stroke characteristic was improved, and a person can be comfortably seated with sufficient fitting feeling.

Test Example 3

In the test example 3, the load-deflection characteristic of the cushion member 1 with the structure depicted in FIG. 2, which employed the three-dimensional knitted fabric as the upper layer 20, was measured in a manner similar to the test example 2. In the test example 3, the three-dimensional knitted fabric constituting the upper layer 20 was the product number T05112 with a thickness of 7 mm manufactured by Asahi Kasei Corporation, and this three-dimensional knitted fabric was stacked and fixed to polyurethane foam (hardness: 83.5 N, density: 0.02 g/cm$^3$) with a thickness of 3 mm or 5 mm as the intermediate layer 10 which is similar to that of the test example 1. Here, the three-dimensional knitted fabric was fixed so that an adhesive intruded between strands of the ground knit adjacent to the intermediate layer 10 in the three-dimensional knitted fabric constituting the upper layer 20. As for the lower layer 30, the three-dimensional knitted fabric used in the test example 1, product number "T27016B", was used. In the test example 3, the three-dimensional knitted fabric (T05112) of the upper layer 20 and the three-dimensional knitted fabric (T27016B) of the lower layer 30 were positioned so that their roll directions (winding direction of the roll of the three-dimensional knitted fabric) are orthogonal to each other if the layers were stacked and fixed to the 3 mm thick polyurethane foam, and were positioned so that their roll directions are in parallel to each other if the layers were stacked and fixed to the 5 mm thick polyurethane foam.

Figure 19:
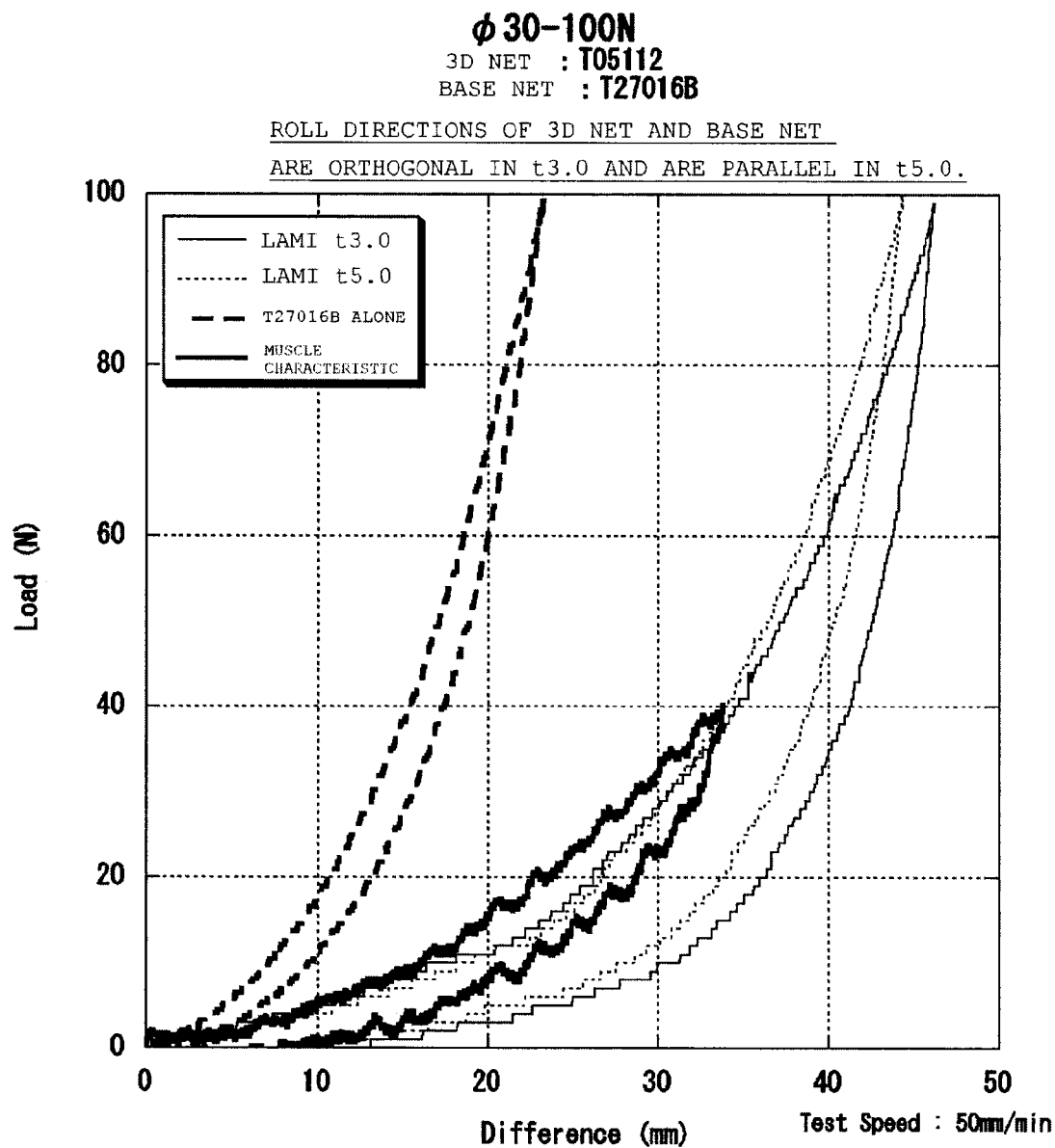
FIG. 19 is a diagram for showing the load-deflection characteristic obtained by pressing a cushion member with a pressure plate with a diameter of 30 mm in a test example 3.
Figure 20:
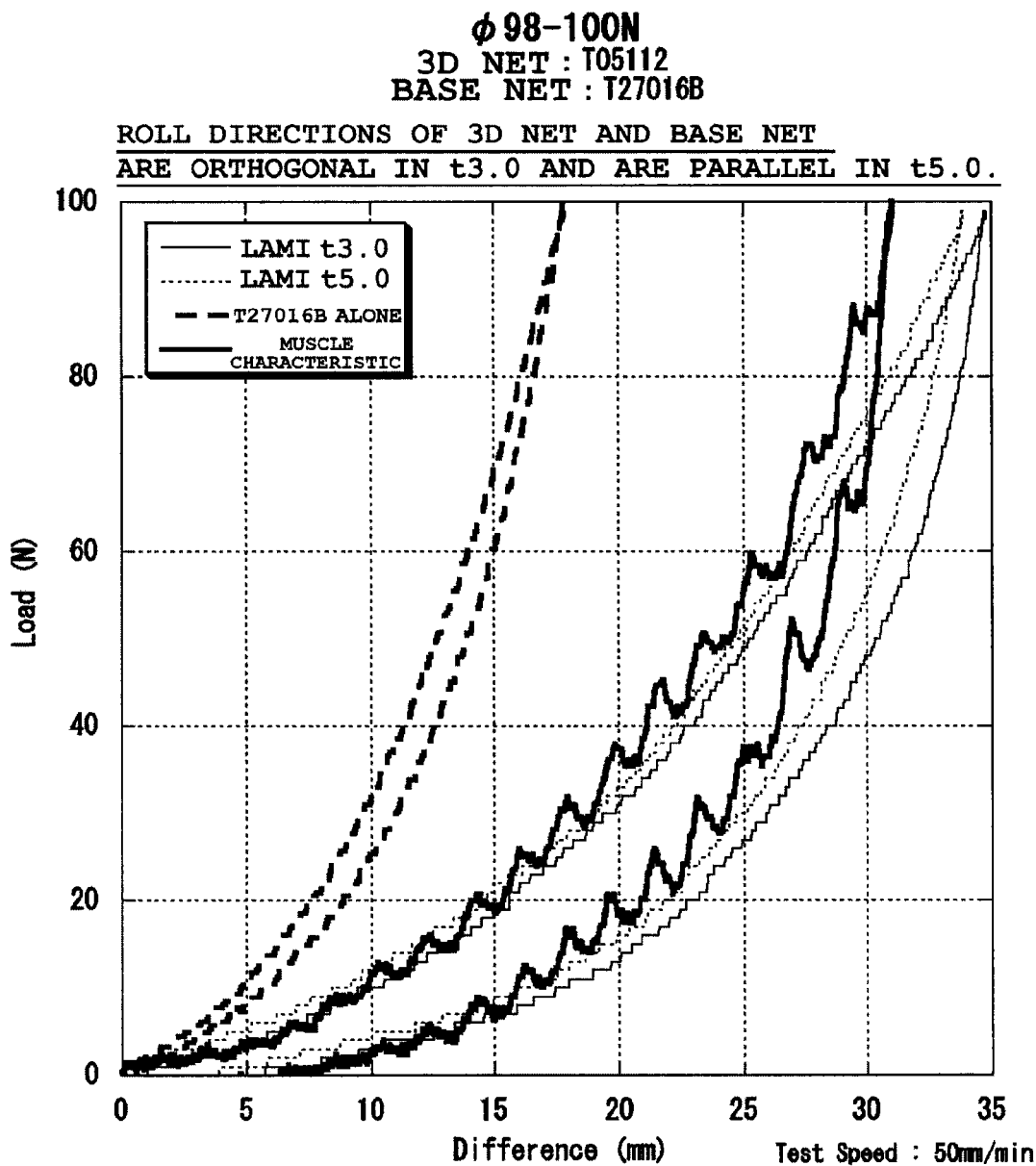
FIG. 20 is a diagram for showing the load-deflection characteristic obtained by pressing a cushion member with a pressure plate with a diameter of 98 mm in the test example 3.
Figure 21:
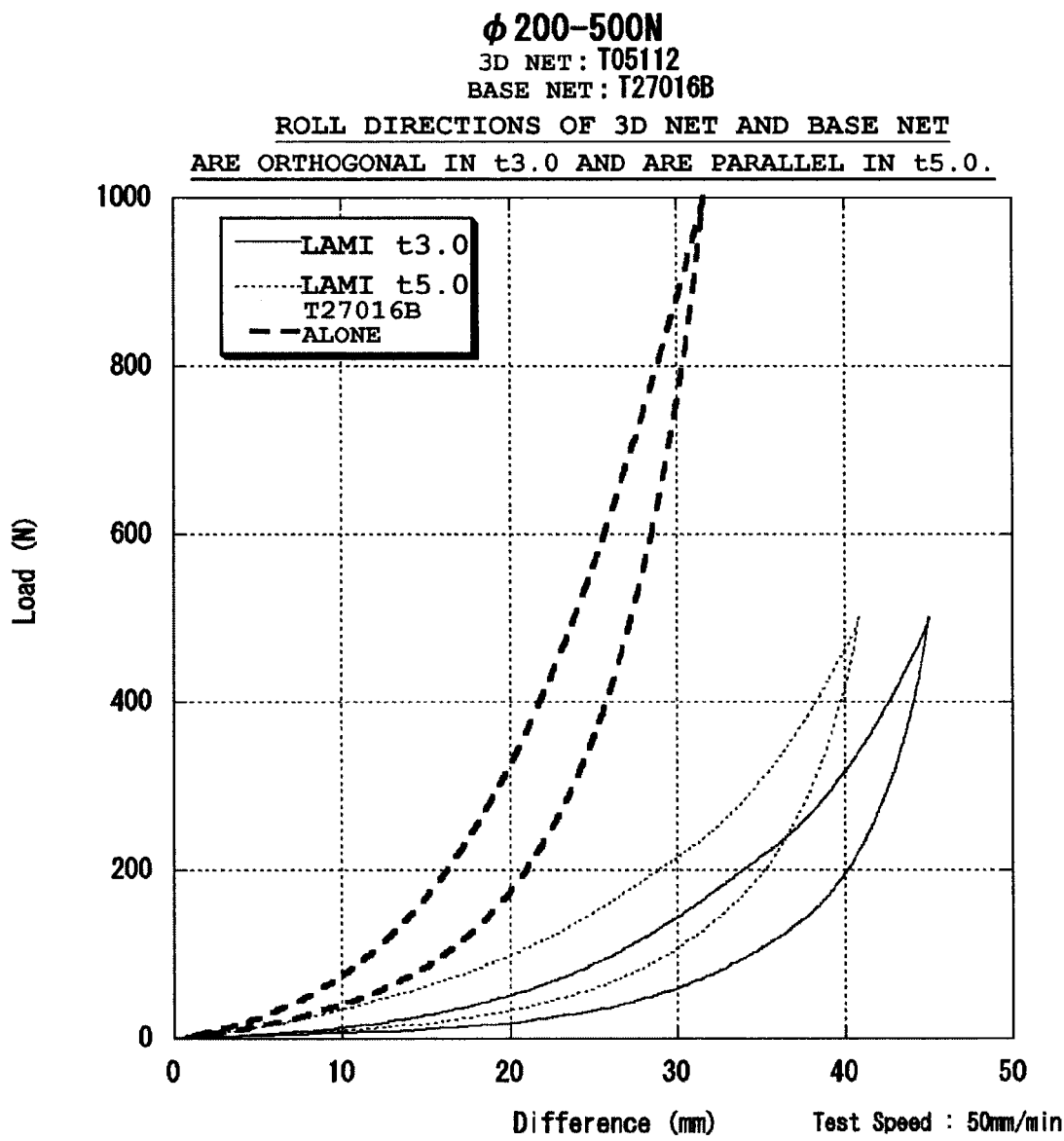
FIG. 21 is a diagram for showing the load-deflection characteristic obtained by pressing a cushion member with a pressure plate with a diameter of 200 mm in the test example 3.

In the test, in a manner similar to the test example 2, the load-displacement characteristic was measured in the case where the load was applied up to 100 N by abutting a circular pressure plate with a diameter of 30 mm or a diameter of 98 mm in the vicinity of the center of the cushion member 1, and the case where the load was applied up to 500 N by abutting a circular pressure plate with a diameter of 200 mm in the vicinity of the center of the cushion member 1. The results are shown in FIG. 19 to FIG. 21. In the drawings, "lami t3.0" represents the data obtained by the stack on the 3 mm thick polyurethane foam, and "lami t5.0" represents the data obtained by the stack on the 5 mm thick polyurethane foam.

As a result of comparing the strokes obtained by applying pressure with a pressure plate with a diameter of 30 mm in FIG. 19, the stroke increased by approximately 24 mm for "lami t3.0" and approximately 22 mm for "lami t5.0" relative to the "T27016B" alone. As a result of comparing the strokes obtained by applying pressure with a pressure plate with a diameter of 98 mm in FIG. 20, the stroke increased by approximately 18 mm for "lami t3.0" and approximately 16 mm for "lami t5.0" relative to the "T27016B" alone. As a result of comparing the strokes obtained by applying pressure with a pressure plate with a diameter of 200 mm in FIG. 21, the stroke increased by approximately 14 mm for "lami t3.0" and approximately 10 mm for "lami t5.0" relative to the "T27016B" alone which was pressed up to 1000 N although the "lami t3.0" and "lami t5.0" were pressed up to 500 N. Therefore, in any case, it is understood that the stroke increased more than the thickness of the polyurethane foam constituting the intermediate layer 10, which is similar to the test example 2.

Figure 28:
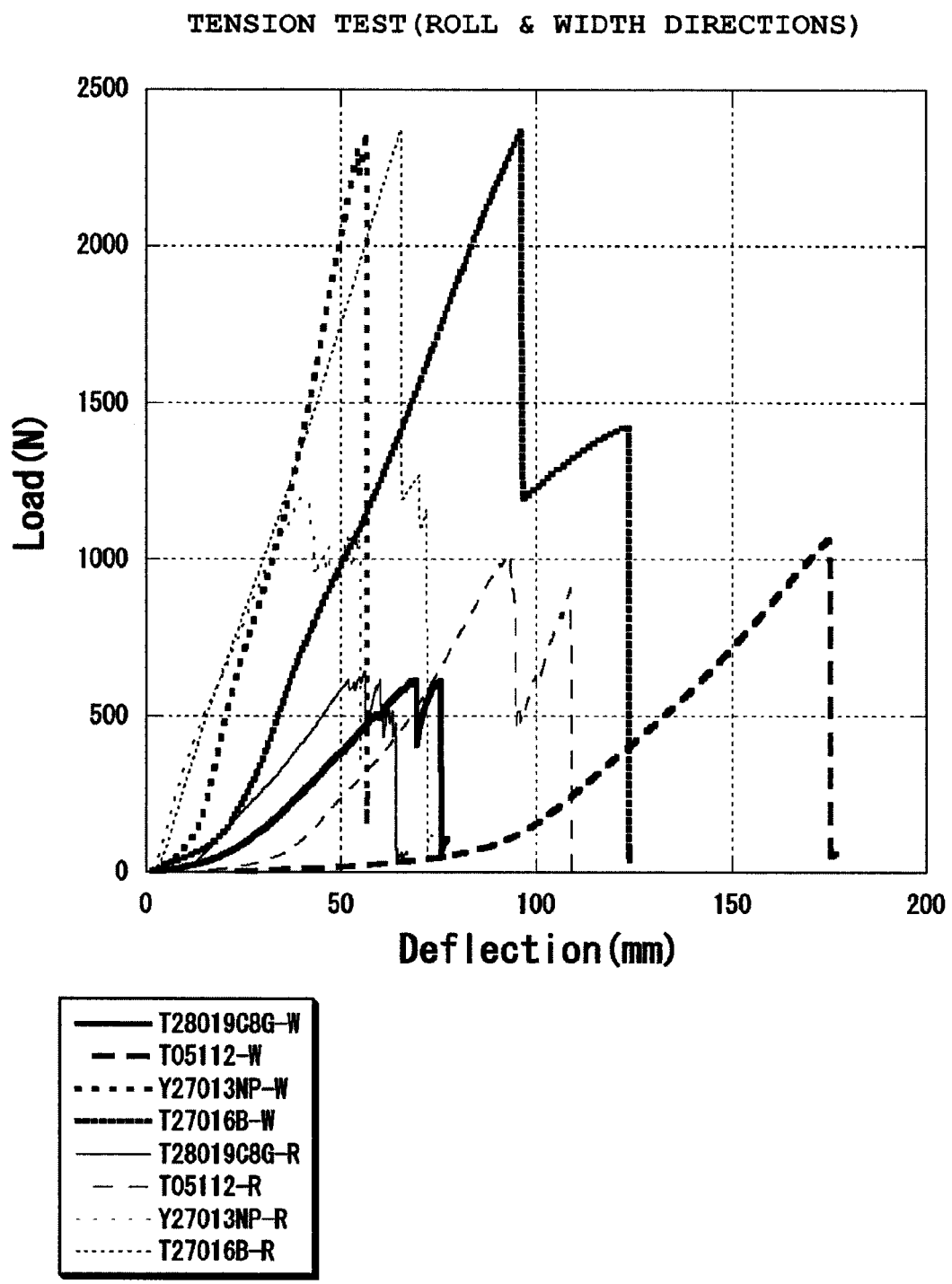
FIG. 28 is a diagram for showing the tensile characteristic of the two-dimensional or three-dimensional cloth used as the upper layer or the lower layer in each test example.

However, the comparison between "lami t3.0" and "lami t5.0" indicates that the stroke of "lami t5.0" is higher in any case in the test example 2. It is considered that this is because the difference in thickness of the polyurethane foam is reflected in the stroke; in the case of the test example 3, however, the stroke is higher in "lami t3.0" which has thinner polyurethane foam. In the test example 3, the upper layer 20 and the lower layer 30 are positioned so that their roll directions are orthogonal to each other in "lami t3.0" while the roll direction are in parallel to each other in "lami t5.0". Here, FIG. 28 shows the data obtained by comparing the tensile characteristic of each cloth of the lower layer 30 in the roll direction and the width direction. Thus, since the tensile characteristic is different in the roll direction and the width direction, if the roll directions are parallel to each other (the same direction), the two cloths are pulled in the same direction; accordingly, the anisotropy is provided that the cloths are difficult to expand particularly in the width direction. On the contrary, if the orthogonal positional relation is employed, the different tensile characteristics are utilized to substantially achieve the isotropy.

Thus, the test example 2 and the test example 3 indicate that by arbitrarily selecting the direction of stacking the upper layer and the lower layer, it is possible to set so that the different load-deflection characteristic can be obtained while using the same material.

Test Example 4

In the test example 4, the load-deflection characteristic of the cushion member 1 with the structure depicted in FIG. 2, which employed the three-dimensional knitted fabric as the upper layer 20, was measured. In the test example 4, the three-dimensional knitted fabric constituting the upper layer 20 was the product number T05112 with a thickness of 7 mm manufactured by Asahi Kasei Corporation, and this three-dimensional knitted fabric was stacked and fixed to polyurethane foam (hardness: 83.5 N, density: 0.02 g/cm$^3$) with a thickness of 3 mm or 5 mm as the intermediate layer 10, which is similar to that of the test example 1. Here, the three-dimensional knitted fabric was fixed so that an adhesive intrudes between strands of the ground knit adjacent to the intermediate layer 10 in the three-dimensional knitted fabric constituting the upper layer 20. As for the lower layer 30, the two-dimensional cloth with a thickness of 1 mm used in the test example 1 (product number: Y27013NP, manufactured by Asahi Kasei Corporation) was used. In the test example 4, the three-dimensional knitted fabric (T05112) of the upper layer 20 and the two-dimensional knitted fabric (Y27013NP) of the lower layer 30 were stacked and fixed to the intermediate layer 10 so that their roll directions (winding direction of the roll of the three-dimensional knitted fabric or the two-dimensional cloth) are orthogonal to each other.

Figure 22:
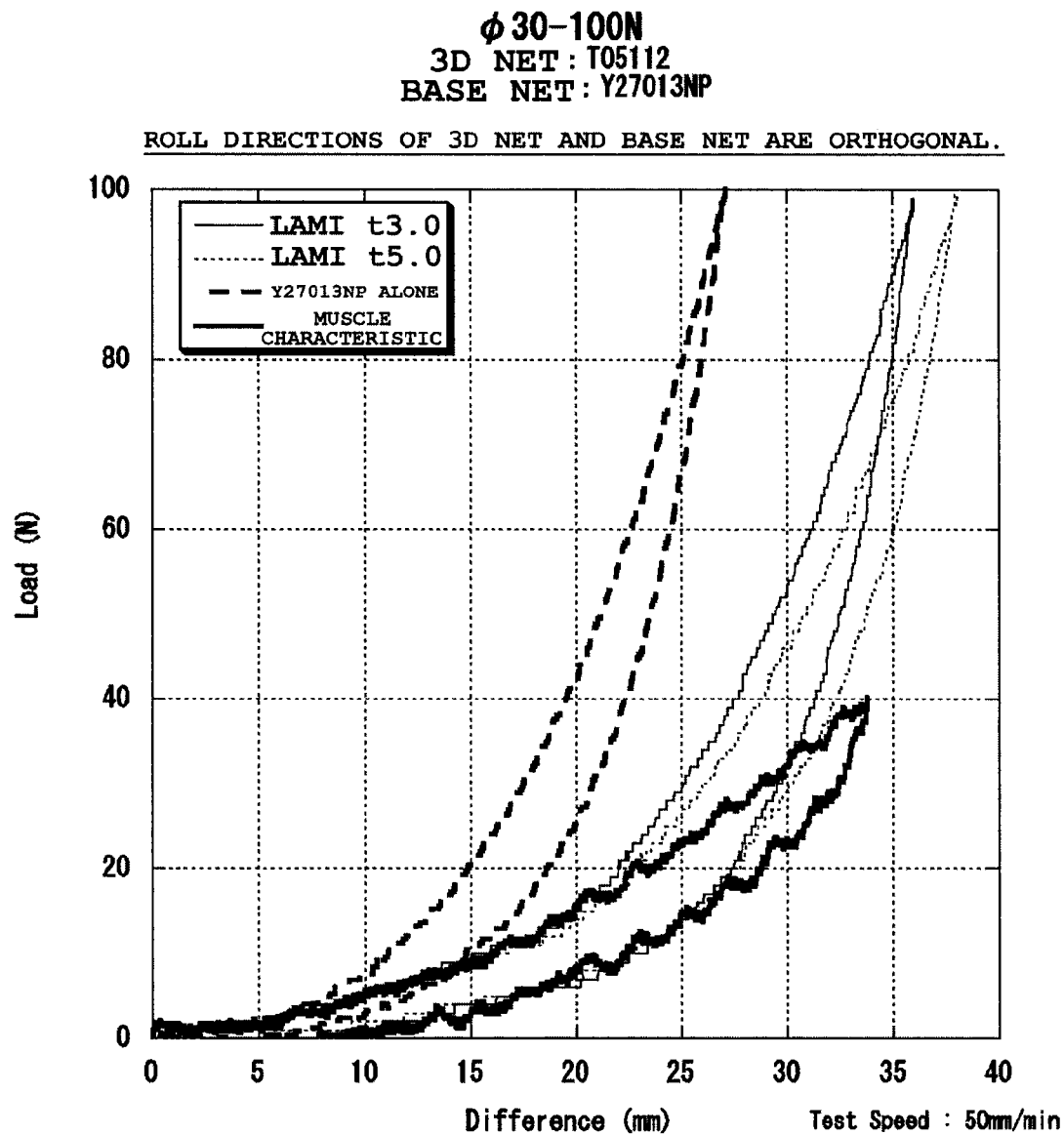
FIG. 22 is a diagram for showing the load-deflection characteristic obtained by pressing a cushion member with a pressure plate with a diameter of 30 mm in a test example 4.
Figure 23:
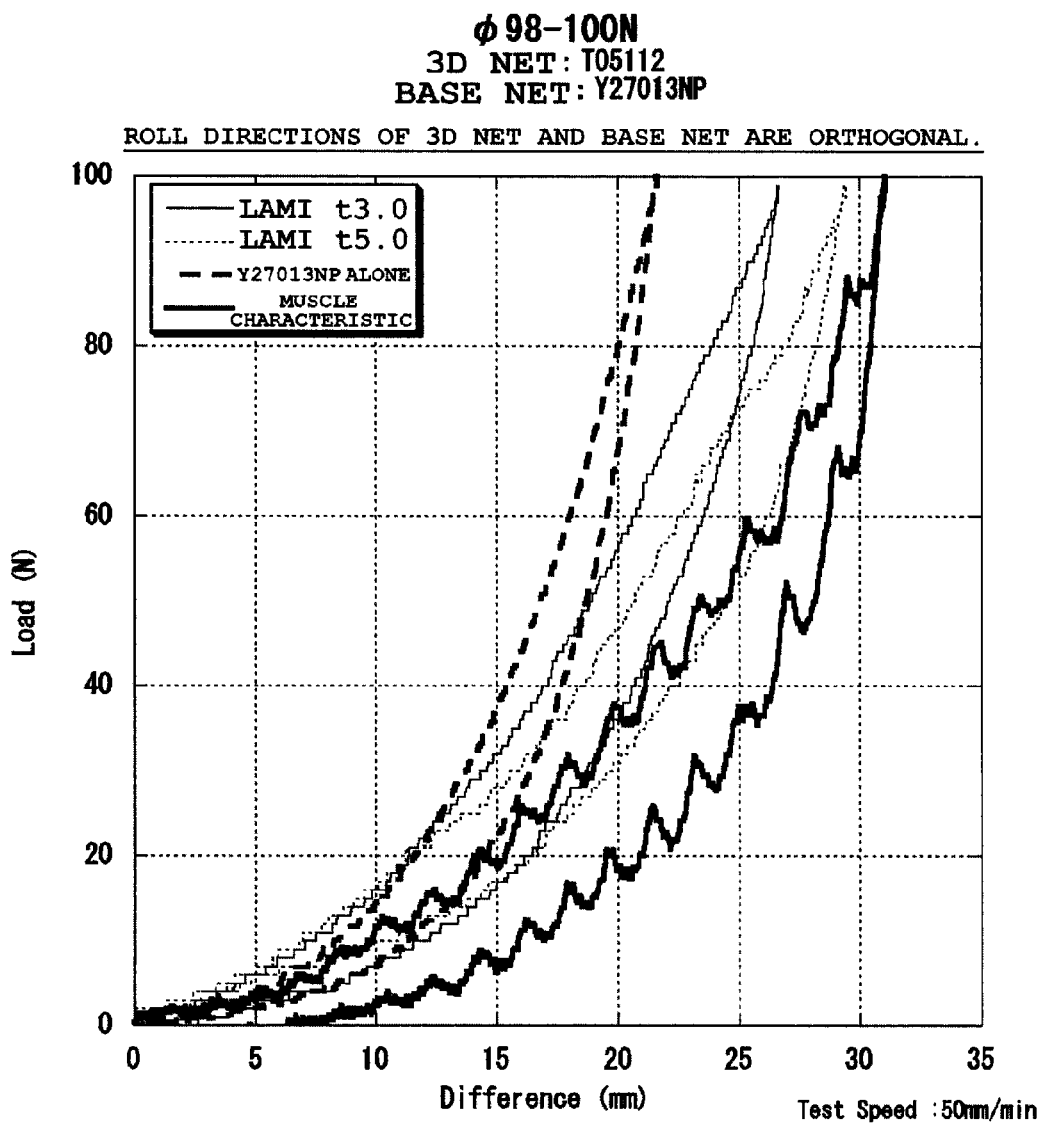
FIG. 23 is a diagram for showing the load-deflection characteristic obtained by pressing a cushion member with a pressure plate with a diameter of 98 mm in the test example 4.
Figure 24:
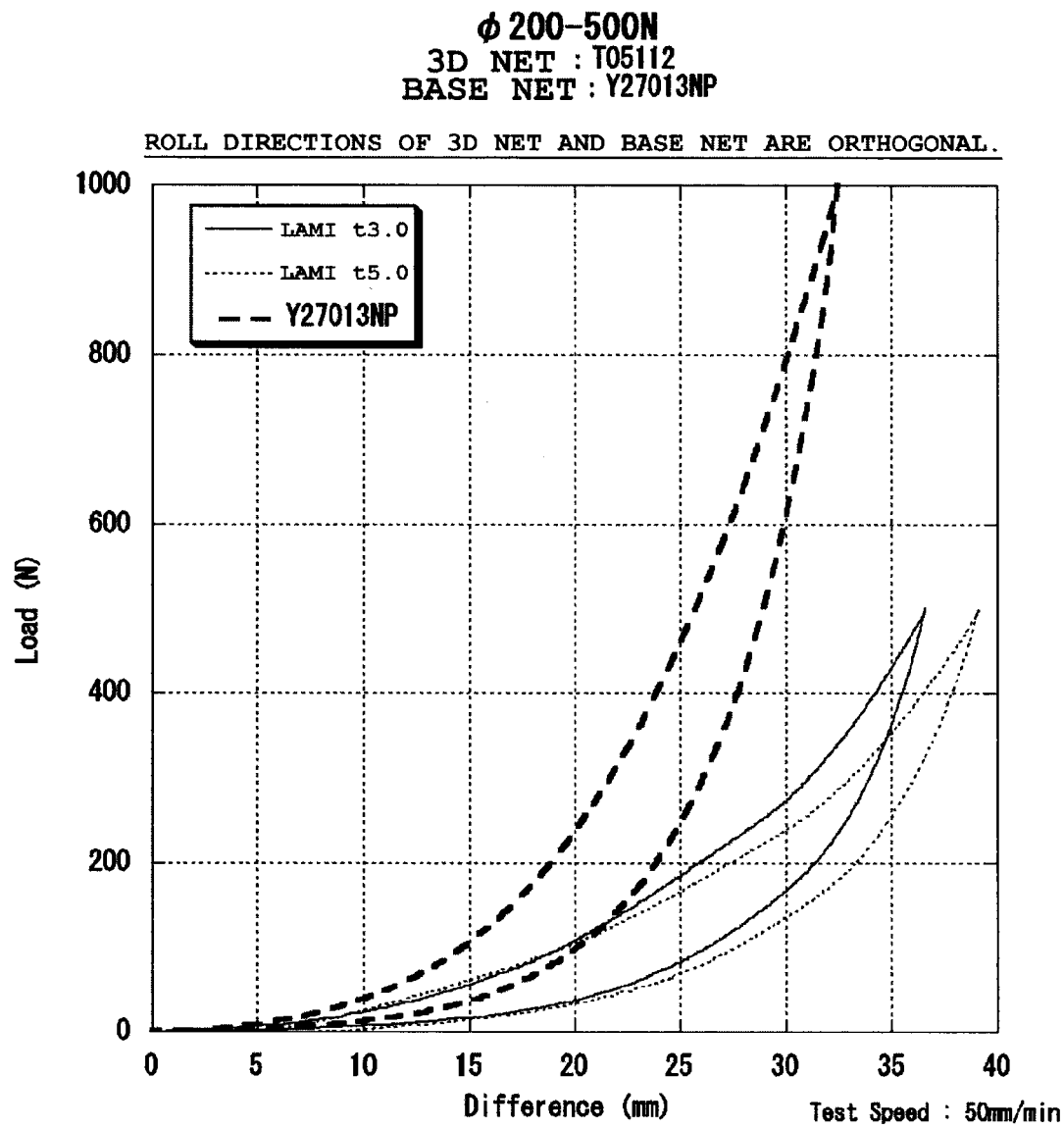
FIG. 24 is a diagram for showing the load-deflection characteristic obtained by pressing a cushion member with a pressure plate with a diameter of 200 mm in the test example 4.

In the test, as depicted in FIG. 9, the load-displacement characteristic was measured in the case where the load was applied up to 100 N by abutting a circular pressure plate with a diameter of 30 mm or a diameter of 98 mm in the vicinity of the center of the cushion member 1, and the case where the load was applied up to 500 N by abutting a circular pressure plate with a diameter of 200 mm in the vicinity of the center of the cushion member 1. The results are shown in FIG. 22 to FIG. 24. In the drawings, "lami t3.0" represents the data obtained by the stack on the 3 mm thick polyurethane foam, and "lami t5.0" represents the data obtained by the stack on the 5 mm thick polyurethane foam.

As a result of comparing the strokes obtained by applying pressure with a pressure plate with a diameter of 30 mm in FIG. 22, the stroke increased by approximately 8 mm for "lami t3.0" and approximately 11 mm for "lami t5.0" relative to the "Y27013NP" alone. As a result of comparing the strokes obtained by applying pressure with a pressure plate with a diameter of 98 mm in FIG. 23, the stroke increased by approximately 6 mm for "lami t3.0" and approximately 8 mm for "lami t5.0" relative to the "Y27013NP" alone. As a result of comparing the strokes obtained by applying pressure with a pressure plate with a diameter of 200 mm in FIG. 24, the stroke increased by approximately 5 mm for "lami t3.0" and approximately 7 mm for "lami t5.0" relative to the "Y27013NP" alone which was pressed up to 1000 N although the "lami t3.0" and "lami t5.0" were pressed up to 500 N. Therefore, in any case, it is understood that the stroke increased more than the thickness of the polyurethane foam constituting the intermediate layer 10, and the stroke characteristic was improved and a person can be comfortably seated with sufficient fitting feeling.

Test example 5

Figure 26:
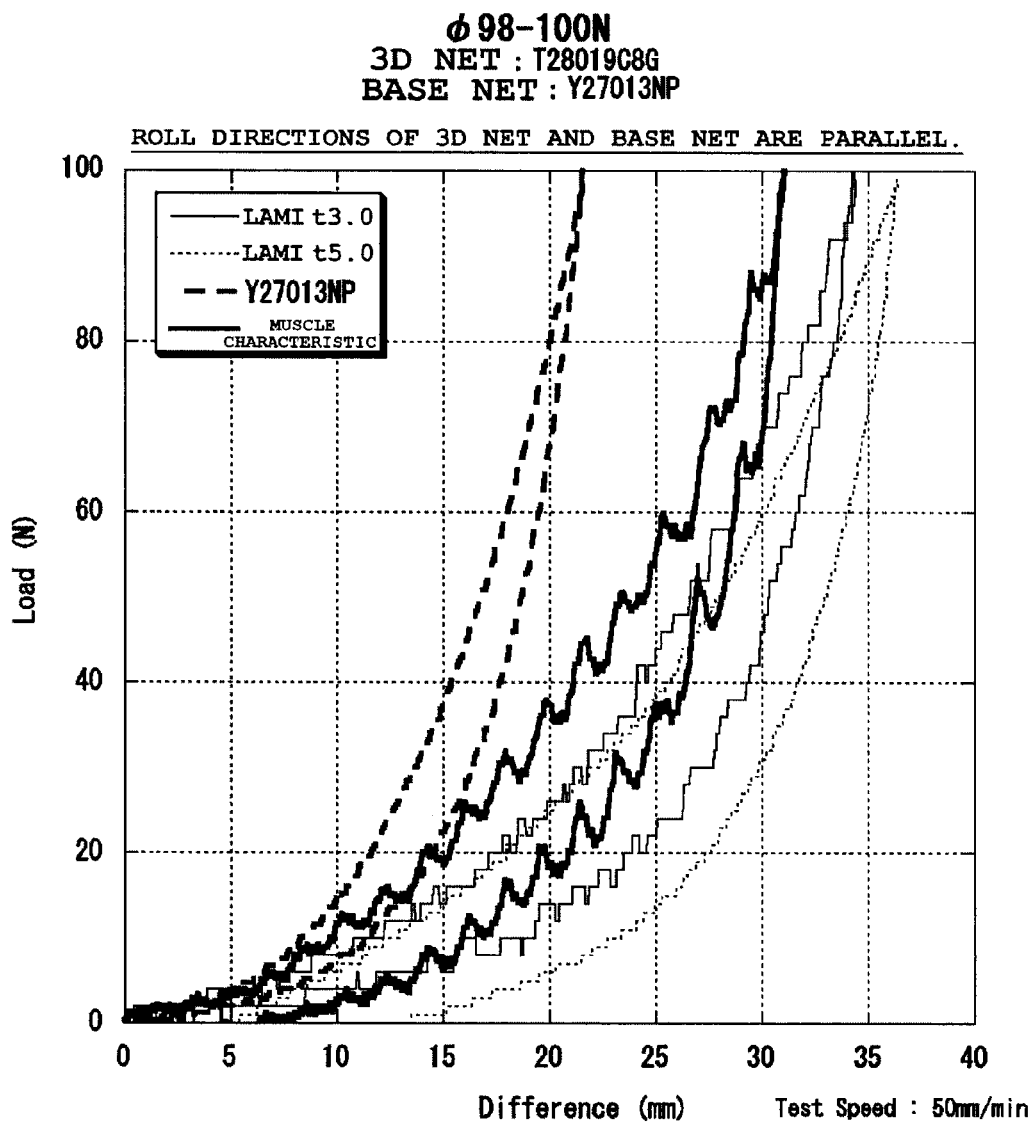
FIG. 26 is a diagram for showing the load-deflection characteristic obtained by pressing a cushion member with a pressure plate with a diameter of 98 mm in the test example 4.
Figure 27:
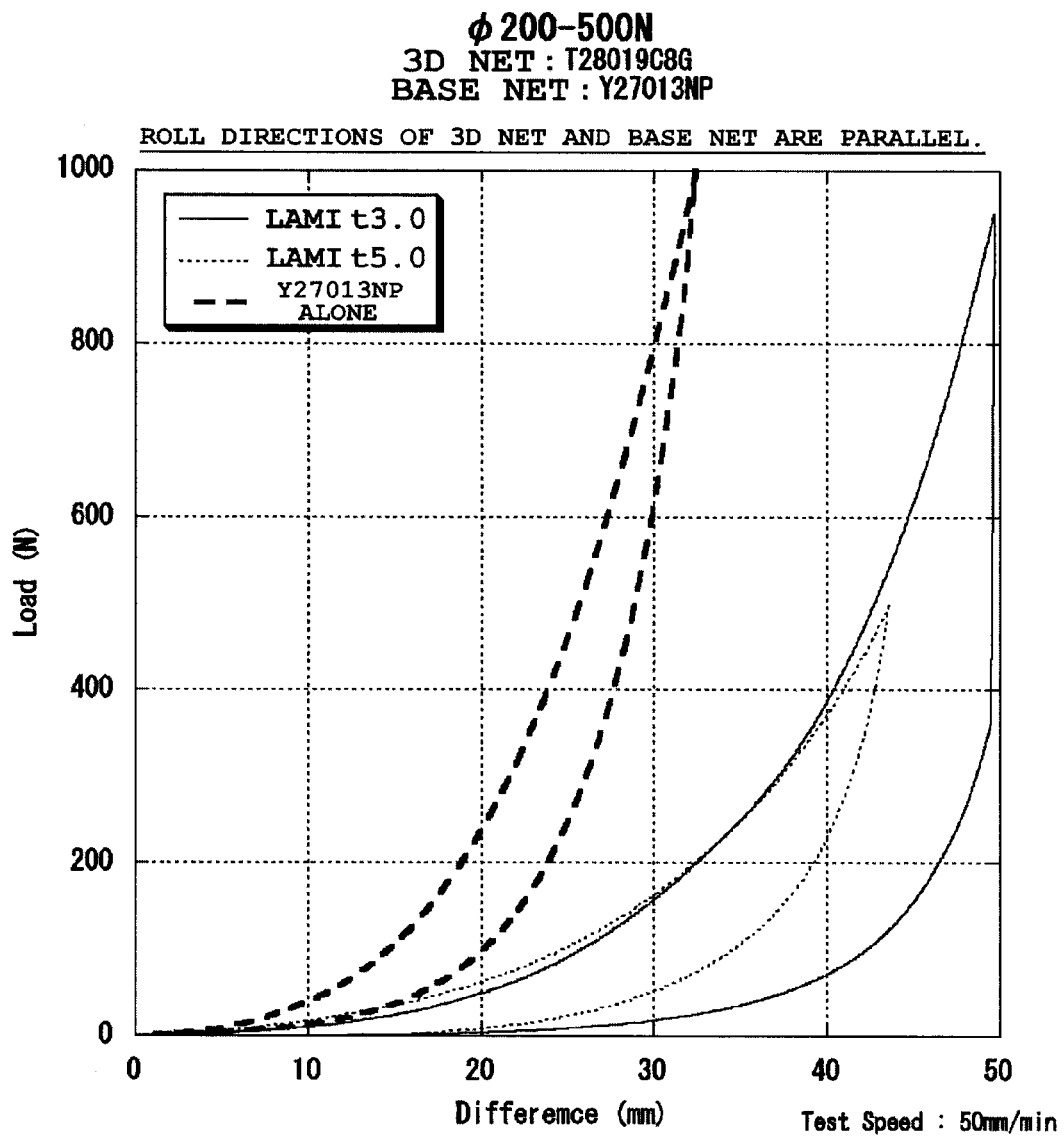
FIG. 27 is a diagram for showing the load-deflection characteristic obtained by pressing a cushion member with a pressure plate with a diameter of 200 mm in the test example 4.

In the test example 5, the test was performed under the same condition as the test example 4 except that the three-dimensional knitted fabric of the upper layer 20 was the same as that of the test example 2, product number: T28019C8G with a thickness of 7 mm manufactured by Asahi Kasei Corporation, and that the upper layer 20 (T28019C8G) and the two-dimensional cloth (Y27013NP) of the lower layer 30 were stacked and fixed to the intermediate layer 10 so that their roll directions (winding direction of the roll of the three-dimensional knitted fabric or two-dimensional cloth) are in parallel to each other. The results are shown in FIG. 25 to FIG. 27.

Figure 25:
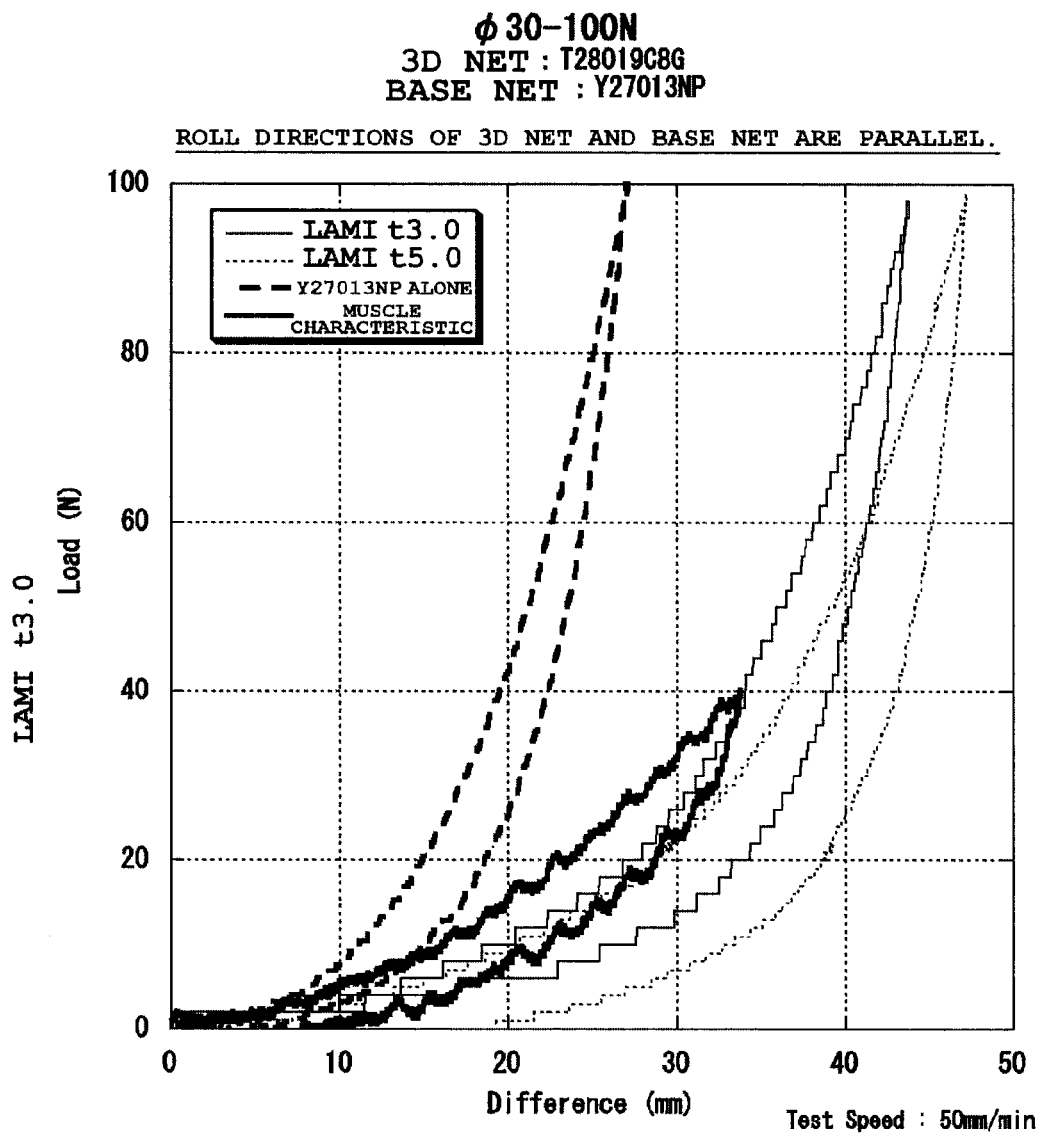
FIG. 25 is a diagram for showing the load-deflection characteristic obtained by pressing a cushion member with a pressure plate with a diameter of 30 mm in the test example 4.

As a result of comparing the strokes obtained by applying pressure with a pressure plate with a diameter of 30 mm in FIG. 25, the stroke increased by approximately 15 mm for "lami t3.0" and approximately 20 mm for "lami t5.0" relative to the "Y27013NP" alone. As a result of comparing the strokes obtained by applying pressure with a pressure plate with a diameter of 98 mm in FIG. 26, the stroke increased by approximately 13 mm for "lami t3.0" and approximately 16 mm for "lami t5.0" relative to the "Y27013NP" alone. As a result of comparing the strokes obtained by applying pressure with a pressure plate with a diameter of 200 mm in FIG. 27, the stroke increased by approximately 11 mm for "lami t5.0" relative to the "Y27013NP" alone which was pressed up to 1000 N although the "lami t5.0" was pressed up to 500 N. Moreover, "lami t3.0" represents the data obtained by pressing up to approximately 1000 N, and in this case, the stroke increased by approximately 18 mm for "lami t3.0" relative to the "Y27013NP" alone. Therefore, in the test example 5, it is understood that the stroke increased more than the thickness of the polyurethane foam constituting the intermediate layer 10, and the stroke characteristic was improved and a person can be comfortably seated with sufficient fitting feeling.

Figure 29:
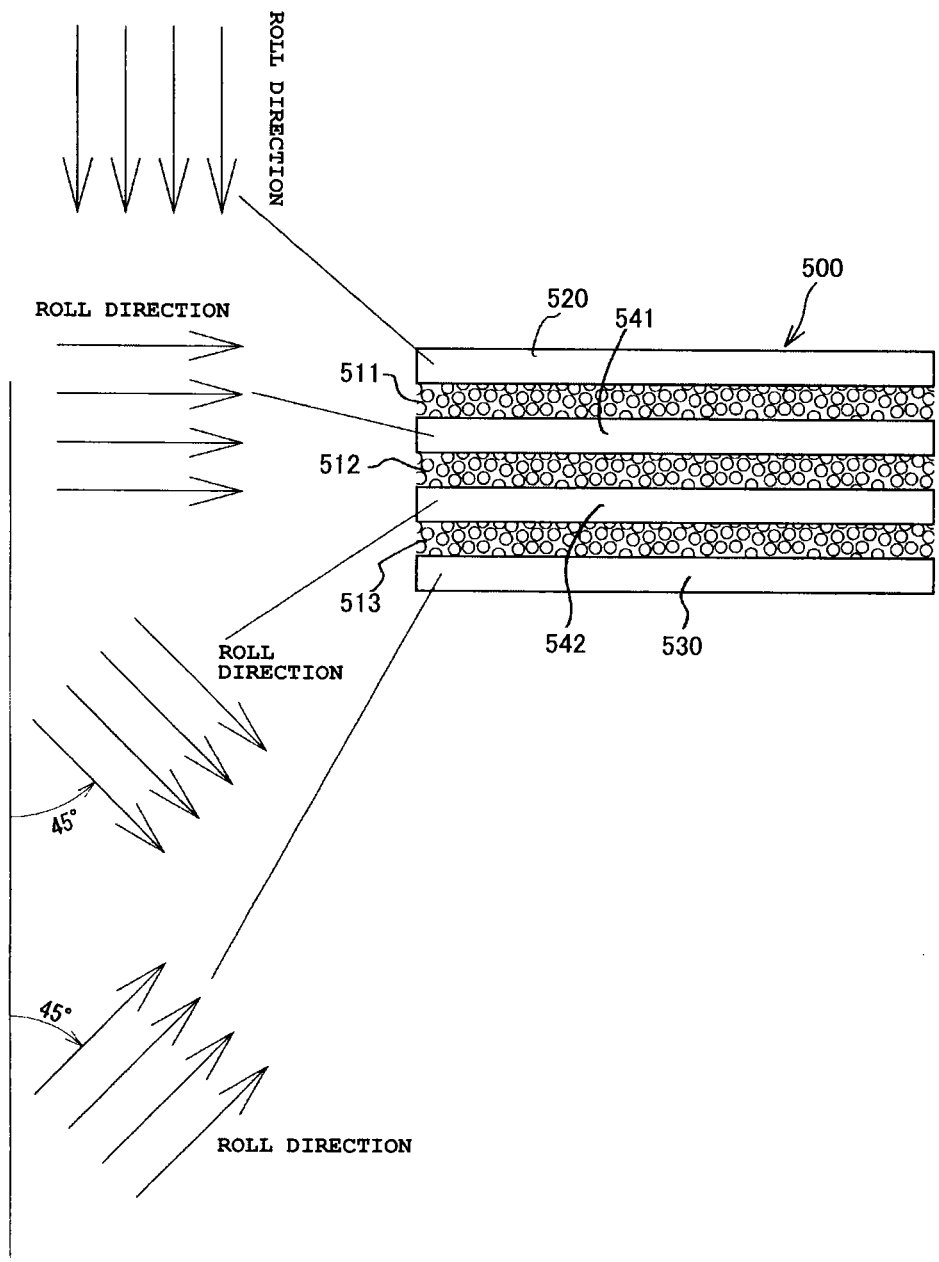
FIG. 29 illustrates an example of the cushion member in which a plurality of layers is used as the intermediate layer.

In the above embodiment, the upper layer 20 and the lower layer 30 are stacked and fixed to one intermediate layer 10; however, the number of intermediate layers may be two or more to form a cushion member 500. FIG. 29 depicts one example thereof, in which three of first to third intermediate layers 511, 512, and 513 are provided. Each of the intermediate layers 511 to 513 is provided with the upper layer on the front surface side and the lower layer on the back surface side; however, the lower layer of the first intermediate layer 511 is also used as the upper layer of the second intermediate layer 512, and the lower layer and the upper layer are one layer (hereinafter, referred to as "first double-use layer 541" for convenience). Similarly, the lower layer of the second intermediate layer 512 is also used as the upper layer of the third intermediate layer 513, and the lower layer and the upper layer are one layer (hereinafter, referred to as "second double-use layer 542" for convenience). Note that the upper layer of the first intermediate layer 511, which is located on the outermost side, is denoted by the reference symbol 520, and the lower layer of the third intermediate layer 513 is denoted by the reference symbol 530.

For the upper layer 520, the first double-use layer 541, the second double-use layer 542, and the lower layer 530 are formed of the aforementioned two-dimensional cloth or three-dimensional cloth; by setting the positional relation of the direction of arranging the clothes at the time of stacking the clothes (whether the roll directions are in parallel to each other or orthogonal to each other) as desired, the characteristic can be set as desired in the range of the anisotropy to the isotropy (see the test example 2).

In the example of FIG. 29, the upper layer 520 and the first double-use layer 541 are disposed in the orthogonal positional relation, the second double-use layer 542 is tilted by 45° relative to the first double-use layer 541, and the lower layer 530 is disposed orthogonal to the second double-use layer 542. By forming the multilayer cloths and displacing the positions of the cloths little by little as depicted in FIG. 29, the tensile characteristic can be made closer to the isotropy, thereby forming a stronger cushion member.

DESCRIPTION OF REFERENCE SIGNS

1 cushion member
1*a* to 1*d* end part
10 intermediate layer
20 upper layer
30 lower layer
50 three-dimensional knitted fabric
51, 52 ground knit
53 connecting strands
200 fixture
500 cushion member
511 to 513 intermediate layer
520 upper layer
530 lower layer
541 first double-use layer
542 second double-use layer

The invention claimed is:

1. A cushion member comprising:
   a multilayer structure including at least one intermediate layer and an upper layer and a lower layer stacked above and below the intermediate layer, wherein
   the intermediate layer includes a resin foam with a predetermined thickness;
   the upper layer and the lower layer are fixed to a front surface side and a back surface side of the resin foam included in the intermediate layer, respectively;
   the cushion member is provided as a tensile structure by being stretched between frames disposed apart from each other by a predetermined distance so that the upper layer on a front side has higher tension than the lower layer in a plane direction;
   at least one of the upper layer or the lower layer comprises a three-dimensional cloth;
   the three-dimensional cloth includes a pair of ground knits disposed apart from each other and a number of connecting strands for connecting the pair of ground knits by going back and forth between the pair of ground knits; and
   a part of the resin foam included in the intermediate layer in the thickness direction intrudes into a gap at least between ground strands forming one ground knit from one ground knit side of the three-dimensional cloth adjacent to the intermediate layer, and an amount of intrusion is in a range of not having contact with at least a part of the other ground knit of the three-dimensional cloth.

2. The cushion member according to claim 1, wherein the cushion member is stretched between the frames by bending an end part so that the upper layer at the end part comes to the front side and the lower layer at the end part comes to a back side, and the upper layer has higher tension than the lower layer in the plane direction.

3. The cushion member according to claim 1, wherein the resin foam and the upper layer, or the resin foam and the lower layer are fixed to each other in a manner that a part of the resin foam in a thickness direction intrudes into a gap between strands of cloth included in the upper layer or the lower layer.

4. The cushion member according to claim 1, wherein a knit texture of at least one ground knit of the three-dimensional cloth has a honeycomb shape.

5. The cushion member according to claim 1, wherein the amount of intrusion of a part of the resin foam included in the intermediate layer in the thickness direction from the one ground knit side of the three-dimensional cloth is in the range of ⅓ to ⅔ of the thickness of the three-dimensional cloth.

6. The cushion member according to claim 1, wherein the resin foam included in the intermediate layer is a polyurethane foam.

7. The cushion member according to claim 1, wherein the upper layer and the lower layer having the intermediate layer interposed therebetween are stacked so that a mutual positional relation based on a roll direction as a winding direction of a roll thereof is set to a predetermined positional relation, thereby setting a tension characteristic of the plane direction to a predetermined characteristic in the range of anisotropy to isotropy.

8. The cushion member according to claim 1, wherein:
two or more of the intermediate layers are provided; and
a layer interposed between the intermediate layers is a layer which serves as both a lower layer of an upper intermediate layer and an upper layer of a lower intermediate layer.

9. The cushion member according to claim 1, wherein the cushion member is stretched for each frame of a seat cushion part, a seat back part, a head rest part, an arm rest part, or an ottoman part with a seat structure.

10. A seat structure having the cushion member according to claim 1 stretched for each frame of a seat cushion part, a seat back part, a head rest part, an arm rest part, or an ottoman part, wherein the cushion member is provided as a tensile structure by being stretched between frames disposed separate from each other by a predetermined distance among the frames so that the upper layer on the front side has higher tension than the lower layer in the plane direction.

11. The seat structure according to claim 10, wherein the cushion member is stretched between the frames by bending the end part of the cushion member so that the upper layer at the end part comes to the front side and the lower layer at the end part comes to the back side.

* * * * *